(12) United States Patent
Sparrow et al.

(10) Patent No.: US 8,137,522 B2
(45) Date of Patent: Mar. 20, 2012

(54) METHOD FOR DESALINATING SALTWATER USING CONCENTRATION DIFFERENCE ENERGY

(75) Inventors: Benjamin Stuart Sparrow, Vancouver (CA); Joshua Zoshi, Vancouver (CA); James Tang, Vancouver (CA)

(73) Assignee: Saltworks Technologies Inc., Vancouver, CA (US)

( * ) Notice: Subject to any disclaimer, the term of this patent is extended or adjusted under 35 U.S.C. 154(b) by 244 days.

(21) Appl. No.: 12/360,714

(22) Filed: Jan. 27, 2009

(65) Prior Publication Data

US 2009/0314718 A1    Dec. 24, 2009

Related U.S. Application Data

(60) Provisional application No. 61/075,327, filed on Jun. 24, 2008.

(30) Foreign Application Priority Data

Jan. 22, 2009  (CA) ..................................... 2649873

(51) Int. Cl.
*B01D 61/46* (2006.01)
(52) U.S. Cl. ........... 204/523; 204/522; 204/529; 429/14
(58) Field of Classification Search .................. 204/523, 204/522, 529; 429/14, 51
See application file for complete search history.

(56) References Cited

U.S. PATENT DOCUMENTS

| | | |
|---|---|---|
| 2,947,688 A | 2/1960 | Murphy |
| 3,300,393 A | 1/1967 | Fisher |
| 3,341,441 A | 9/1967 | Giuffrida et al. |
| 3,587,227 A | 6/1971 | Weingarten et al. |
| 4,141,825 A | 2/1979 | Conger |
| 4,171,409 A | 10/1979 | Loeb |
| 4,225,413 A | 9/1980 | Karn |
| 4,704,189 A | 11/1987 | Assaf |
| 4,832,115 A | 5/1989 | Albers et al. |
| 5,123,481 A | 6/1992 | Albers et al. |
| 5,755,102 A | 5/1998 | Assaf et al. |
| 6,185,940 B1 | 2/2001 | Prueitt |
| 6,804,962 B1 | 10/2004 | Prueitt |

(Continued)

FOREIGN PATENT DOCUMENTS

EP    1233004    1/2005

(Continued)

OTHER PUBLICATIONS

Sergio Ferreira, "Reverse Electrodialysis", submitted Sep. 21, 2007, http://www.leonardo-energy.org/drupal/node/2248, pp. 1-2.

(Continued)

*Primary Examiner* — Arun S Phasge
(74) *Attorney, Agent, or Firm* — Ryan A. Schneider, Esq.; Jihan A. R. Jenkins, Esq.; Troutman Sanders LLP

(57) ABSTRACT

A method and apparatus for desalinating saltwater using concentration difference energy is disclosed. In order to desalinate saltwater that is contained within a product chamber, a drive cell is used to generate a drive voltage. The product chamber has a desalination voltage such that when a sufficient voltage is applied to the product chamber, anions and cations migrate out of the product chamber, thereby desalinating the water. The sufficient voltage, which includes the drive voltage and which is equal to or greater than the desalination voltage, is applied to the product chamber, consequently effecting desalination. Beneficially, concentration difference energy can be generated using a concentrated solution, which can be generated using, for example, solar energy.

24 Claims, 14 Drawing Sheets

U.S. PATENT DOCUMENTS

| | | | |
|---|---|---|---|
| 2006/0225420 | A1 | 10/2006 | Al-Mayahi et al. |
| 2006/0263646 | A1* | 11/2006 | Seale .......................... 429/2 |
| 2007/0034514 | A1 | 2/2007 | Riera |

FOREIGN PATENT DOCUMENTS

| | | |
|---|---|---|
| GB | 746609 | 3/1956 |
| WO | WO 2007/009196 | 1/2007 |
| WO | PCT/CA2009/000080 | 12/2009 |

OTHER PUBLICATIONS

"Tapping the Oceans", Economist.com., Science Technology Quarterly, Jun. 5, 2008, pp. 1-6.

John N. Weinstein et al., "Electric Power from Differences in Salinity: The Dialytic Battery", Science, Feb. 13, 1976, vol. 191, pp. 557-559.

Benjamin S. Sparrow, "Empirical Equations for the Thermodynamic Properties of Aqueous Sodium Chloride", Journal of Desalination, Jan. 10, 2003, vol. 159, Issue 2, pp. 161-170.

EDI Spiral from Dow Water Solutions, http://www.dow.com/liquidseps/prod/edi_index.htm.

Joost Veerman, "Power Generation by Reverse Electro Dialysis (RED): System Design", http://net2client.hscg.net/ZZZ/08/08200/Energy%20Joost%20Veerman.pdf.

J. Veerman et al., "Reducing Power Losses Caused by Ionic Shortcut Currents in Reverse Electrodialysis Stacks by a Validated Model", Journal of Membrane Science, Mar. 5, 2008, vol. 310, Issue 1-2, pp. 418-430.

M. Turek et al., "Renewable Energy by Reverse Electrodialysis", ScienceDirect, Journal of Desalination, Feb. 5, 2007, vol. 205, Issues 1-3, pp. 67-74.

J. Schechter et al., "Conceptual Design Study on Electrodialysis Membrane Assembly Modular Unit Design", Research and Development Progress Report No. 681, U.S. Department of Interior, 1971.

Piotr Dlugolecki et al., "Current Status of Ion Exchange Membranes for Power Generation from Salinity Gradients", Journal of Membrane Science, Jul. 1, 2008, vol. 319, Issues 1-2, pp. 214-222.

Wikipedia Article, "Blue Energy", http://en.wikipedia.org/wiki/Reverse_electrodialysis, pp. 1-3.

The IPRP issued in respect of the corresponding PCT application, PCT/CA2009/000080.

The ISR, WO and citable art referenced therein issued in respect of PCT CA/2010/000537 and of a Canadian Office Action issued in respect of CA 2,699,174, wherein both PCT CA/2010/000537 and CA 2,699,174 are directed at similar subject matter as the present application.

George W. Murphy, "Osmionic Demineralization", Ind. Eng. Chem., 1958, 50 (8), pp. 1181-1188.

\* cited by examiner

METHOD FOR DESALINATING SALTWATER USING CONCENTRATION DIFFERENCE ENERGY

CROSS-REFERENCES TO RELATED APPLICATIONS

This application claims a benefit of both U.S. Provisional Application Ser. No. 61/075,327, filed 24 Jun. 2008, and PCT International Patent Application No. PCT/CA2009/000080, filed 21 Jan. 2009, the entire contents and substance of both hereby incorporated by reference.

BACKGROUND OF THE INVENTION

1. Field of the Invention

The present invention relates to a method, apparatus and plant for desalinating saltwater. More particularly, the present invention relates to a method, apparatus and plant for desalinating saltwater by utilizing the energy difference that exists between two solutions of different solute concentrations that are separated by an ion exchange membrane.

2. Background of the Invention

Over one quarter of Earth's population does not have adequate access to freshwater. Inadequate access to freshwater is detrimental, as it can lead to disease and malnutrition, limit agricultural development, and inhibit economic growth.

In contrast to freshwater, however, saltwater is readily available. Saltwater in the form of seawater constitutes about 97% of the water on Earth. Unless seawater is sufficiently desalinated, though, it is not only undrinkable, but unsuitable for agriculture. "Desalination" refers to the process of removing anions and cations from saltwater. Seawater typically has a salt concentration of about 3.5% by mass; that is, about 35 grams of dissolved salt per liter of water. In contrast, drinkable water typically has a salt concentration of, at most, about 0.04%.

Several desalination methods are currently known in the art. One of the most popular methods at present is reverse osmosis ("RO"). RO involves mechanically forcing saltwater through spirally wound, semi-permeable membranes at high pressure. The membranes filter salt from the saltwater. Saltwater that is filtered using RO requires extensive pre-treatment, which increases RO's energy requirements. RO also suffers from performance issues when the temperature of the saltwater is over about 30° C., which can be the case when the saltwater source is water from a warm ocean or powerplant outlet, for example.

Additional methods of desalination are multiple effect distillation ("MED") or multi-stage flash ("MSF"). MED and MSF desalinate saltwater by repeatedly evaporating and condensing the saltwater over a series of multiple stages. The source of the energy for MED and MSF processes is usually low pressure steam. The primary drawback of MED and MSF processes is the large amount of thermal energy these processes consume, which is typically an order of magnitude higher than the electrical energy used by RO.

Another method of desalination is electrodialysis ("ED"). ED achieves desalination through a separation process whereby dissolved salt ions are transferred from a feed stream to a concentrate stream through ion exchange membranes under the influence of an externally applied electric potential. This ion transport is typically conducted using an ED stack, which is constructed using an alternating arrangement of ion exchange membranes, with feed and concentrate streams flowing between the membranes. One problem with ED is that it consumes more energy than RO for desalination of seawater, and that the source of such energy is entirely in the form of an externally applied electric potential. In addition to problems associated with energy consumption, electrical hardware in the form of a direct current power source or rectifiers to generate direct current from an alternating current power source is required. A second problem with ED is that often, as a result of the magnitude of the externally applied electric potential, voltage gradients cause salt ions to migrate not only through the ion exchange membranes as intended but also through the manifolding used in the ED stack. This results in circulating ionic current losses and reduces the efficiency of ED.

Consequently, there is a need for a method and apparatus for desalinating saltwater that improves on the prior art.

SUMMARY OF THE INVENTION

According to a first aspect of the invention, there is provided an apparatus for desalinating saltwater. The apparatus includes a plurality of drive cells for generating a drive voltage, each drive cell having a diluent chamber for containing a diluent of a first ionic concentration, a concentrate chamber for containing a concentrate of a second ionic concentration that is greater than the first ionic concentration, one of a cation or anion exchange membrane forming a shared boundary between and in ionic communication with the diluent and concentrate chambers, and the other of the cation or anion exchange membrane forming a shared boundary between and in ionic communication with each drive cell and an adjacent drive cell. The apparatus also includes a product chamber anion exchange membrane, a product chamber cation exchange membrane, and a product chamber for containing the saltwater to be desalinated. The product chamber is bounded on one side by and is in ionic communication with the product chamber anion exchange membrane and is bounded on another side by and is in ionic communication with the product chamber cation exchange membrane. The product chamber is in ionic communication with the plurality of drive cells via the product chamber anion or cation exchange membrane. The apparatus also includes a manifolding assembly having diluent, concentrate and product manifolding configured to convey the diluent to and away from the diluent chamber, the concentrate to and away from the concentrate chamber, and the saltwater to be desalinated to and desalinated saltwater away from the product chamber, respectively.

The apparatus may further include a diluent chamber gasket, a concentrate chamber gasket and a product chamber gasket circumscribing each of the diluent chamber, the concentrate chamber and the product chamber, respectively. Each of the diluent chamber, concentrate chamber and product chamber gaskets can contain therein a spacer for maintaining separation of cation and anion exchange membranes.

The diluent, concentrate and product manifolding may respectively include a diluent supply conduit and a diluent exit conduit, a concentrate supply conduit and a concentrate exit conduit and a product feed supply conduit and a product exit conduit, each of which extend through the diluent, concentrate and product gaskets. The diluent manifolding can have an inlet notch in the diluent chamber gasket fluidly coupling the diluent supply conduit to the diluent chamber and an outlet notch in the diluent chamber gasket fluidly coupling the diluent exit conduit to the diluent chamber. Similarly, the concentrate manifolding can have an inlet notch in the concentrate chamber gasket fluidly coupling the concentrate supply conduit to the concentrate chamber and an outlet notch in the concentrate chamber gasket fluidly coupling the concentrate exit conduit to the concentrate chamber; and the product manifolding can have an inlet notch in the product chamber gasket fluidly coupling the product feed supply conduit to the product chamber and an outlet notch in the product chamber gasket fluidly coupling the product exit conduit to the product chamber.

The apparatus for desalinating saltwater can also have an anion discharge chamber and a cation discharge chamber, which are in ionic communication with the product chamber through the product chamber anion exchange membrane and the product chamber cation exchange membrane, respectively.

The apparatus can also include anode and cathode electrolyte chambers for containing an electrolyte; anode and cathode stack end ion exchange membranes, the anode and cathode electrolyte chambers in ionic communication with the plurality of drive cells and product chamber through the anode and cathode stack end ion exchange membranes, respectively; and an anode and a cathode. The anode electrolyte chamber can be bounded on one side by and be in ionic communication with the anode stack end ion exchange membrane and can be bounded on another side by and be in electrical communication with the anode. Similarly, the cathode electrolyte chamber can be bounded on one side by and be in ionic communication with the cathode stack end ion exchange membrane and be bounded on another side by and be in electrical communication with the cathode.

The plurality of drive cells, product chamber, anion discharge chamber and cation discharge chamber can be arranged in the shape of a ring. Alternatively, the plurality of drive cells, product chamber, anion discharge chamber and cation discharge chamber can be wound in the shape of a spiral.

Additionally, there may be provided one or both of a voltage source or an electrical load electrically coupled between the anode and cathode.

The anode and the cathode may each have a substrate having a coating thereon. The substrate can be composed of a material selected from the group consisting of titanium, niobium, tantalum, iridium, palladium, steel, stainless steel, nickel and graphite, and the coating can be composed of a material selected from the group consisting of platinum, ruthenium, iridium, and an alloy comprising platinum, ruthenium and iridium.

The apparatus may also include a electrolyte chamber fluid conduit fluidly coupling the anode electrolyte chamber to the cathode electrolyte chamber; and a pump in fluid communication with the electrolyte chamber fluid conduit configured to pump the electrolyte from one of the anode and cathode electrolyte chambers to the other of the electrolyte chambers such that electrochemical reaction by-products formed in one of the anode and cathode electrolyte chambers can be used as a reactant in the other of the electrolyte chambers.

The anode and cathode may be gas diffusion electrodes in gaseous communication with each other such that gas produced at one of the anode or cathode can be circulated to the other of the anode or cathode.

The apparatus for desalinating saltwater may also include first and second electrolyte chambers for containing an electrolyte; first and second ion exchange membranes, the first and second electrolyte chambers in ionic communication with the plurality of drive cells and the product chamber through the first and second ion exchange membranes, respectively; and porous first and second end plates. The first electrolyte chamber can be bounded on one side by and be in ionic communication with the porous first end plate and can be bounded on another side by and be in ionic communication with the first ion exchange membrane. Similarly, the second electrolyte chamber can be bounded on one side by and be in ionic communication with the porous second end plate and can be bounded on another side by and be in ionic communication with the second ion exchange membrane. The apparatus can be sealed such that when the apparatus is submerged within a conductive bath, ionic current will flow in the conductive bath between the first and second electrolyte chambers through the porous first and second end plates, respectively.

The apparatus can also include first and second electrolyte chambers for containing electrolyte; first and second ion exchange membranes, the first and second electrolyte chambers in ionic communication with the plurality of drive cells and the product chamber through the first and second ion exchange membranes, respectively; first and second end plates, the first electrolyte chamber bounded on one side by and in ionic communication with the first end plate and bounded on another side by the first ion exchange membrane, the second electrolyte chamber bounded on one side by and in ionic communication with the porous second end plate and bounded on another side by the second ion exchange membrane; an electrolyte chamber fluid conduit fluidly coupling the first electrolyte chamber to the second electrolyte chamber; and a pump in fluid communication with the electrolyte chamber fluid conduit configured to pump the electrolyte from one of the first and second electrolyte chambers to the other of the electrolyte chambers.

According to a further aspect of the invention, there is provided an apparatus for desalinating saltwater capable of operating in forward polarity and reverse polarity. The apparatus includes a stack configured to receive a diluent of a first ionic concentration, a concentrate of a second ionic concentration greater than the first ionic concentration, and saltwater to be desalinated. The stack has a plurality of drive cells, each drive cell comprising a diluent/concentrate chamber, a concentrate/diluent chamber, one of a cation or anion exchange membrane forming a shared boundary between and in ionic communication with the diluent/concentrate and concentrate/diluent chambers, and the other of the cation or anion exchange membrane forming a shared boundary between and in ionic communication with each drive cell and an adjacent drive cell; a product/diluent chamber anion exchange membrane and a product/diluent chamber cation exchange membrane; a product/diluent chamber bounded on one side by and in ionic communication with the product/diluent chamber anion exchange membrane and bounded on another side by and in ionic communication with the product/diluent chamber cation exchange membrane, the product/diluent chamber in ionic communication with the drive cell via the product/diluent chamber anion or cation exchange membranes; a diluent/product chamber anion exchange membrane and a diluent/product chamber cation exchange membrane; a diluent/product chamber bounded on one side by and in ionic communication with the diluent/product chamber anion exchange membrane and bounded on another side by and in ionic communication with the diluent/product chamber cation exchange membrane, the diluent/product chamber in ionic communication with the drive cell via the diluent/product chamber anion or cation exchange membranes; and a manifolding assembly comprising diluent/concentrate, concentrate/diluent, product/diluent, and diluent/product manifolding respectively configured to convey diluent to and away from the diluent/concentrate and diluent/product chambers, concentrate to and away from the concentrate/diluent chamber, and the saltwater to be desalinated to and desalinated saltwater away from the product/diluent chamber when the apparatus is operating in forward polarity, and respectively configured to convey diluent to and away from the concentrate/diluent and product/diluent chambers, concentrate to and away from the diluent/concentrate chamber, and the saltwater to be desalinated to and the desalinated saltwater away from the diluent/product chamber when the apparatus is operating in reverse polarity.

The apparatus can also include a diluent/concentrate chamber gasket, a concentrate/diluent chamber gasket, a product/diluent chamber gasket, and a diluent/product chamber gasket circumscribing each of the diluent/concentrate chamber, the concentrate/diluent chamber, the product/diluent chamber, and the diluent/product chamber, respectively. Each of the diluent/concentrate chamber, concentrate/diluent chamber and product/diluent chamber gaskets can contain therein a spacer for maintaining separation of cation and anion exchange membranes.

The diluent/concentrate, concentrate/diluent, product/diluent, and diluent/product manifolding may respectively include a diluent/concentrate supply conduit and a diluent/concentrate exit conduit, a concentrate/diluent supply conduit and a concentrate/diluent exit conduit, a product/diluent supply conduit and a product/diluent exit conduit, and a diluent/product supply conduit and a diluent/product exit conduit, each of which extend through the diluent/concentrate, concentrate/diluent, product/diluent, and diluent/product gaskets. The diluent/concentrate manifolding can have an inlet notch in the diluent/concentrate chamber gasket fluidly coupling the diluent/concentrate supply conduit to the diluent/concentrate chamber and an outlet notch in the diluent/concentrate chamber gasket fluidly coupling the diluent/concentrate exit conduit to the diluent/concentrate chamber. Similarly, the concentrate/diluent manifolding can have an inlet notch in the concentrate/diluent chamber gasket fluidly coupling the concentrate/diluent supply conduit to the concentrate/diluent chamber and an outlet notch in the concentrate/diluent chamber gasket fluidly coupling the concentrate/diluent exit conduit to the concentrate/diluent chamber; the product/diluent manifolding further comprising an inlet notch in the product/diluent chamber gasket fluidly coupling the product/diluent supply conduit to the product/diluent chamber and an outlet notch in the product/diluent chamber gasket fluidly coupling the product/diluent exit conduit to the product/diluent chamber; and the diluent/product manifolding further comprising an inlet notch in the diluent/product chamber gasket fluidly coupling the diluent/product supply conduit to the diluent/product chamber and an outlet notch in the diluent/product chamber gasket fluidly coupling the diluent/product exit conduit to the diluent/product chamber.

The apparatus can also include first and second electrolyte chambers for containing an electrolyte; first and second stack end ion exchange membranes, the first and second electrolyte chambers in ionic communication with the diluent/concentrate, concentrate/diluent, product/diluent, and diluent/product chambers through the first and second ion exchange membranes, respectively; and first and second electrodes. The first electrolyte chamber can be bounded on one side by and be in ionic communication with the first stack end ion exchange membrane and can be bounded on another side by and be in electrical communication with the first electrode. The second electrolyte chamber can be bounded on one side by and be in ionic communication with the second stack end ion exchange membrane and can be bounded on another side by and be in electrical communication with the second electrode.

The first and second electrodes can each have a substrate having a coating thereon. The substrate can be composed of a material selected from the group of titanium, niobium, tantalum, iridium, palladium, steel, stainless steel, nickel and graphite, and the coating can be composed of a material selected from the group of platinum, ruthenium, iridium, and an alloy comprising platinum, ruthenium and iridium.

According to a further aspect of the invention, there is provided a plant for desalinating saltwater. The plant can include any of the aforedescribed apparatuses for desalinating saltwater; a first reconcentrator configured to remove water from the diluent exiting the apparatus to generate the concentrate; and a concentrate reservoir, in fluid communication with both the first reconcentrator and the concentrate chamber, for holding the concentrate.

The plant can also have a saltwater reservoir, in fluid communication with the product chamber, for holding the saltwater to be desalinated; a diluent reservoir, in fluid communication with the drive cell, for holding the diluent; and a product reservoir, in fluid communication with the product chamber, for storing desalinated saltwater.

Additionally, the plant may have a pre-treatment center fluidly coupled to the saltwater reservoir for treating the saltwater to be desalinated prior to the saltwater entering the saltwater reservoir.

The plant can also include a second reconcentrator in fluid communication with the concentrate reservoir and the apparatus, the second reconcentrator configured to remove water from the concentrate exiting the apparatus.

The pre-treatment center can be fluidly coupled to the diluent reservoir for treating the diluent prior to the diluent entering the diluent reservoir.

One or both of the first and second reconcentrators can be selected from the group consisting of an evaporative pond, an evaporative spray pond, a natural draft evaporative tower, and a forced draft evaporative tower. Additionally, the plant may also include a heat exchanger, fluidly coupled to one or both of the first and second reconcentrators, for transferring heat from a heat source to one or both of the first and second reconcentrators.

According to a further aspect of the invention, there is provided a method for desalinating saltwater. The method includes employing a plurality of drive cells to generate a drive voltage; and applying a sufficient voltage across a product chamber containing the saltwater to be desalinated and in ionic communication with the plurality of drive cells, the product chamber bounded by and in ionic communication with a product chamber anion exchange membrane on one side and bounded by and in ionic communication with a product chamber cation exchange membrane on another side and having a desalination voltage such that when a voltage is applied to the product chamber in excess of the desalination voltage cations and anions migrate from the saltwater through the product chamber cation and anion exchange membranes, respectively, the sufficient voltage comprising the drive voltage and being greater than or equal to the desalination voltage.

Employing a plurality of drive cells to generate a drive voltage can include flowing diluent of a first ionic concentration through diluent chambers in the plurality of drive cells; and flowing concentrate of a second ionic concentration through concentrate chambers in the plurality of drive cells, the second ionic concentration greater than the first ionic concentration, one of a cation or anion exchange membrane forming a shared boundary between and in ionic communication with the diluent and concentrate chambers such that ions flow from the concentrate to the diluent, and the other of the cation or anion exchange membrane forming a shared boundary between and in ionic communication with adjacent pairs of drive cells.

The method can further include flowing solution having an ionic concentration greater than or equal to that of the saltwater to be desalinated through anion and cation discharge chambers, the anion and cation discharge chambers in ionic communication with the product chamber via the product chamber anion exchange membrane and the product chamber cation exchange membrane, respectively.

The diluent can be the solution flowing through the anion and cation discharge chambers. Additionally, the diluent and the saltwater to be desalinated can be the same. The diluent and the concentrate can also both be saltwater.

The drive voltage can be equal to or greater than the desalination voltage. In such a case, desalination can be effected without the application of any external voltage.

The method can further include flowing an electrolyte through anode and cathode electrolyte chambers, the anode electrolyte chamber bounded on a first side by and in ionic communication with an anode stack end ion exchange membrane and bounded on another side by and in electrical communication with an anode, and the cathode electrolyte chamber bounded on a first side by and in ionic communication with a cathode stack end ion exchange membrane and bounded on another side by and in electrical communication with a cathode, the anode and cathode electrolyte chambers ionically communicative with the product chamber via the anode and cathode stack end ion exchange membranes, respectively, and the anode and cathode electrically communicative with each other such that electrons flow from the anode to the cathode.

The diluent and the concentrate can flow through the diluent and concentrate chambers, respectively, in countercurrent directions.

The method can further include flowing the saltwater to be desalinated through an initial desalination stage in series ionic communication with the drive cell, the initial desalination stage comprising an initial stage product chamber bounded on one side by and in ionic communication with an initial stage product chamber anion exchange membrane and bounded on another side by and in ionic communication with an initial stage product chamber cation exchange membrane, the initial stage product chamber having a desalination voltage such that when a voltage is applied to the initial stage product chamber in excess of the desalination voltage cations and anions migrate from the saltwater through the initial stage product chamber cation and anion exchange membranes, respectively; flowing the saltwater to be desalinated through a subsequent desalination stage, the subsequent desalination stage in series ionic communication with the drive cell, the subsequent desalination stage comprising a subsequent desalination stage product chamber bounded on a first side by and in ionic communication with a subsequent stage product chamber anion exchange membrane and bounded on another side by and in ionic communication with a subsequent stage product chamber cation exchange membrane, the subsequent stage product chamber having a desalination voltage such that when a voltage is applied to the subsequent stage product chamber in excess of the desalination voltage cations and anions migrate from the saltwater through the subsequent stage product chamber cation and anion exchange membranes, respectively, the saltwater to be desalinated flowing through the initial stage and subsequent stage product chambers; and applying the sufficient voltage across the initial and subsequent stage product chambers, the sufficient voltage comprising the drive voltage and being greater than or equal to the sum of the desalination voltages of the initial and subsequent stage product chambers.

One or both of the initial stage and subsequent stage product chambers can include a plurality of product chambers, and flowing the saltwater to be desalinated through the initial and subsequent desalination stages can include flowing the saltwater to be desalinated in parallel through the plurality of product chambers of any given stage.

An external voltage across the anode and the cathode can also be applied by using a voltage source electrically coupled between the anode and cathode. An electrical load electrically coupled between the anode and cathode can be powered when the drive voltage is greater than the desalination voltage.

The electrolyte may be have a sodium, calcium, magnesium or potassium cation and the anode and cathode ion exchange membranes can both be cation exchange membranes. Alternatively, the electrolyte may have a chlorine, sulphate or bromine anion and the anode and cathode ion exchange membranes can both be anion exchange membranes.

The electrolyte may be selected from the group consisting of $Na_2SO_4$, NaCl, NaOH, HCl, $Na_3Fe(CN)_6$, $Na_2S_4O_6$, $Na_2S_2O_3$, $Na_4Fe(CN)_6$, $K_3Fe(CN)_6$, $K_4Fe(CN)_6$, $Na_2S_2O_3$, $NH_4Cl$, $NH_4$, $Na_2Cr_2O_7$, and $CrCl_3$.

The method can further include pumping the electrolyte from one of the anode and cathode electrolyte chambers to the other of the anode and cathode electrolyte chambers such that electrochemical reaction by-products formed in one of the anode and cathode electrolyte chambers can be used as a reactant in the other of the electrolyte chambers.

Additionally, the method can further include flowing concentrate through first and second electrolyte chambers, the first electrolyte chamber bounded on one side by and in ionic communication with a first ion exchange membrane and bounded on another side by and in ionic communication with a porous first end plate and the second electrolyte chamber bounded on a first side by and in ionic communication with a second ion exchange membrane and bounded on a second side by and in ionic communication with a porous second end plate, the first and second electrolyte chambers ionically communicative with the product chamber via the first and second ion exchange membranes, respectively; and submerging the porous first and second end plates within a conductive bath such that ionic current flows between the conductive bath and the porous first and second end plates.

One advantage of the present invention is that by relying on a drive voltage generated by the difference in concentrations between diluent and concentrate to effect desalination, it is possible to use solar energy or another form of readily accessible low temperature energy (such as waste heat from a power plant) to generate the concentrated solution that is used to generate the drive voltage. Thus, energy that would otherwise be wasted can be used to generate the concentrate and to effect desalination, allowing for less electrically intensive desalination of saltwater relative to prior art methods of and means for desalination. This is especially beneficial as arid climates are those with abundant available solar energy and are also those that are likely to require desalination.

A further advantage of the present invention is that as drive cells are used to generate the drive voltage, an external power supply is not required, which can reduce the capital costs associated with practicing the method and operating the apparatus and plant of the present invention.

In contrast to ED, a further advantage of the present invention is that voltage gradients do not built up to the same extent as with an ED stack, and consequently less ion migration occurs through stack manifolds as can occur in an ED stack. This reduces circulated ionic current losses in the present invention relative to ED.

In contrast to RO, a further advantage of the method of the present invention is that its performance is not substantially negatively affected when desalinating warm saltwater greater than about 30° C. and requires less pre-treatment as water is not forced through a semi-permeable membrane that could foul.

Advantages of the apparatus of the present invention include its ease of manufacturing, durability and robustness.

An additional advantage of the apparatus of the present invention includes the ability to desalinate saltwater by operating the apparatus at a lower pressure than comparable RO systems, which lowers the cost of the components used to manufacture the apparatus of the present invention relative to the RO systems, which incorporate expensive allowed and stainless steels and other high pressure components.

DETAILED DESCRIPTION OF EXEMPLARY EMBODIMENTS

Two ionic solutions that differ only in the concentration of the solute dissolved therein have different amounts of chemical energy. This difference in chemical energy is hereinafter referred to as "concentration difference energy". For example, when equal volumes of solutions of saltwater and freshwater are placed in adjacent chambers and are separated from each other solely by a membrane that is water permeable, but not ion permeable, the concentration difference energy causes water from the freshwater container to flow into and develop pressure in the saltwater container.

Similarly, when equal volumes of solutions of saltwater and freshwater are placed in adjacent chambers and are separated from each other solely by a membrane that is ion permeable, but not water permeable, the concentration difference energy results in a voltage difference between the two chambers. A membrane that is ion permeable, but not water permeable, is hereinafter referred to as an "ion exchange membrane". Monopolar ion exchange membranes include "cation exchange membranes" and "anion exchange membranes". Cation and anion exchange membranes are those membranes that allow only cations (positively charged ions) and anions (negatively charged ions) to pass through, respectively. Exemplary cation exchange membranes include Neosepta CMX, CM-1; Ralex CMH-PES; Fumasep FKE, FKD; and Selemion CMV membranes. Exemplary anion exchange membranes include Neosepta AM-1, AFN, AMX; Ralex AMH-PES; Fumasep FAD; and Selemion DVS, APS membranes.

In order to desalinate saltwater, at least some of the cations (primarily $Na^+$) and anions (primarily $Cl^-$) in the saltwater need to be removed from the saltwater. Removing these ions requires energy.

The embodiments described herein utilize concentration difference energy to aid in removal of cations and anions from saltwater, thereby desalinating the saltwater.

Figure 1:
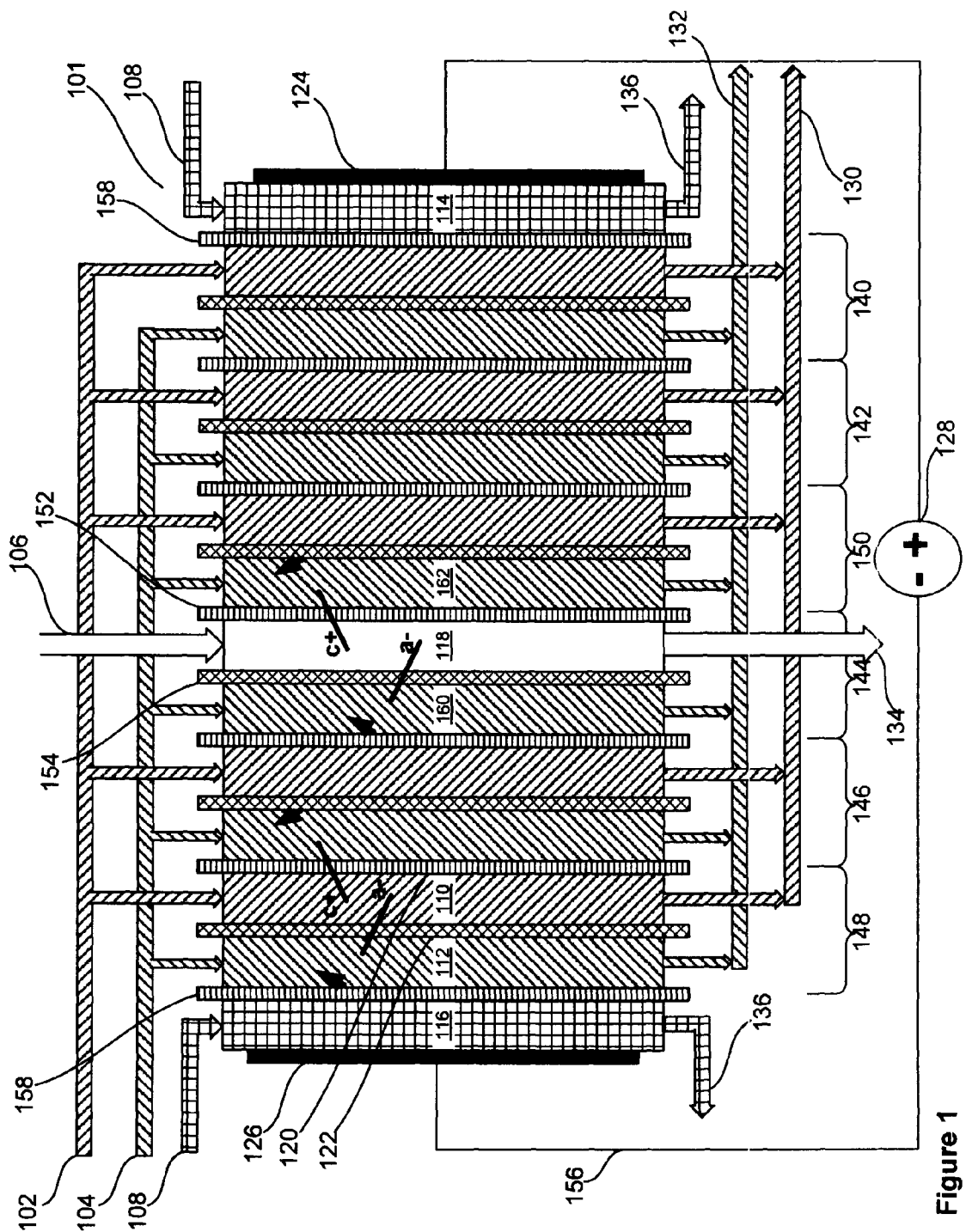
FIG. 1 is a schematic view of a dialytic stack for desalinating saltwater according to a first embodiment wherein the stack operates in "forward polarity"

Referring now to FIG. 1, there is depicted a schematic view of a dialytic stack 101 for desalinating saltwater. The dialytic stack 101 is composed of a series of alternating concentrate and diluent chambers 110 and 112, respectively. Flowing through each of the diluent chambers 112 is a solution of a first ionic concentration ("diluent") and flowing through each of the concentrate chambers 110 is a solution of a second ionic concentration ("concentrate"), with the second ionic concentration being greater than the first ionic concentration. Diluent may enter and exit the diluent chambers 112 via diluent supply and exit conduits 104 and 132, respectively. Concentrate may enter and exit the concentrate chambers 110 via concentrate supply and exit conduits 102 and 130, respectively. Adjacent diluent and concentrate chambers 112, 110 are separated from each other by one of the cation and anion exchange membranes 120 and 122, respectively. Located in the embodiment of FIG. 1 is a product chamber 118 through which flows the saltwater to be desalinated ("product feed"). Product feed that has passed through the product chamber 118 and has had at least some anions and cations removed therefrom is hereinafter referred to as "product". The product feed may enter the product chamber 118 via a product feed supply conduit 106, and the resulting product exits the product chamber 118 via a product exit conduit 134. The product feed and the diluent may both be seawater having a salt concentration of about 3.5% by mass, while the concentrate may be hyper-concentrated seawater having a salt concentration of about 15%-28% by mass. Alternatively, the diluent may be slightly concentrated saltwater having a salt concentration of about 3.5% to about 6% by mass. The salt concentration of the concentrate must be higher than the salt concentration of the diluent and can be as high as the solubility limit in water of whichever salts are present in the concentrate. The manner in which this hyper-concentrated seawater can be produced is discussed in more detail with respect to FIGS. 10-14, below.

In the embodiment depicted in FIG. 1, each pair of chambers 140, 142, 144, 146, 148 (each a "drive cell") is composed of one of the diluent chambers 112 and one of the concentrate chambers 110, the diluent and concentrate chambers 112, 110 separated from each other by and in ionic communication with one of the anion exchange membranes 122. As discussed above, the concentration difference energy that exists between the concentrate and diluent results in the drive cell generating a voltage ("drive voltage"). In an embodiment wherein the concentrate is about 18% aqueous sodium chloride by mass and the diluent is about 3.5% aqueous sodium chloride by mass, the theoretical drive voltage for each drive cell is about 0.04 Volts.

In FIG. 1, the anion exchange membrane 122 forms a shared boundary between and is in ionic communication with the diluent and concentrate chambers 112, 110 of any given drive cell, and the cation exchange membrane 120 forms a shared boundary between and is in ionic communication with any given drive cell and an adjacent drive cell (see, e.g. the drive cell 148 having the anion exchange membrane 122 between its diluent and concentrate chambers 112, 110 and having the cation exchange membrane 120 between the concentrate chamber 110 of the drive cell 148 and the diluent chamber 112 of the adjacent drive cell 146). A cation or anion exchange membrane 120 or 122 that contacts the fluid contained within a chamber when the chamber is filled with fluid is said to "bound" that chamber and, consequently, also be in ionic communication with that chamber.

Each of the drive cells is separated from an adjacent drive cell by one of the cation exchange membranes 120. As the ion exchange membranes 120, 122 allow ions to flow from the concentrate to the diluent chambers, the drive cells 140, 142, 144, 146, 148 are in ionic communication with each other. The drive voltage generated by a group of drive cells in ionic communication with each other is equal to the sum of the voltages produced by each of the drive cells in the series. Consequently, the total drive voltage produced by the drive cells 140, 142, 144, 146, 148 is about 0.20 Volts.

The dialytic stack 101 also contains a desalination cell 150, which is composed of one of the diluent chambers 112 and a product chamber 118. The product chamber 118 is bounded on one side by and is in ionic communication with one of the anion exchange membranes 122 ("product chamber anion exchange membrane" 154) and is bounded on another side by and is in ionic communication with one of the cation exchange membranes 120 ("product chamber cation exchange membrane" 152). The diluent chamber 112 that is separated from the product chamber 118 by and is in ionic communication with the product chamber anion exchange membrane 154 is hereinafter referred to as the "anion discharge chamber" 162. The diluent chamber 112 that is separated from the product chamber 118 by and is in ionic communication with the product chamber cation exchange membrane 152 is hereinafter referred to as the "cation discharge chamber" 160. The product chamber 118 is in ionic communication with the drive cells via the product chamber cation exchange membrane 152 on one side and via the product chamber anion exchange membrane 154 on the other. Flowing through the product chamber 118 is the saltwater to be desalinated. Typically, the salt concentration of the product feed as it enters the dialytic stack 101 is less than or equal to the concentrations of the solutions in the chambers adjacent to the product chamber 118.

In order to desalinate the product feed, a certain voltage ("desalination voltage") has to be applied across the product chamber 118. In the illustrated embodiment, in order to desalinate the product feed to a resulting product concentration of about 0.04% salt by mass such that anions and cations in the product feed are driven from the product chamber 118 into adjacent diluent chambers 112 containing diluent of about 3.5% salt by mass, the desalination voltage is about 0.088 Volts.

When a sufficient voltage greater than the desalination voltage is applied across the product chamber 118, anions migrate towards one electrode, an anode 126, and cations migrate towards another electrode, a cathode 124. Anions migrate from the product chamber 118, through the product chamber anion exchange membrane 154, and into the anion discharge chamber 162. Similarly, cations migrate from the product chamber 118, through the product chamber cation exchange membrane 152, and into the cation discharge chamber 160. In this way, saltwater can be desalinated by employing the drive cell to generate the drive voltage, and by applying the sufficient voltage, which includes the drive voltage, across the product chamber. As described above, flowing through the anion and cation discharge chambers can be a solution having an ionic concentration greater than or equal to that of the saltwater to be desalinated, such as the diluent.

The movement of ions through the dialytic stack 101 that occurs when the sufficient voltage applied to the product chamber 118 is greater than or exceeds the desalination voltage represents movement of ions through an ionic circuit. Various methods of completing this ionic circuit are possible.

In FIG. 1, the ionic circuit is completed electrochemically. Electrochemical completion of the ionic circuit is achieved by disposing anode and cathode electrolyte chambers 114 and 116 between the stack of diluent and concentrate chambers 112, 110 and the anode 126 and cathode 124, respectively. A suitable electrolyte flows into and out of the electrolyte conduits via electrolyte supply conduits 108 and electrolyte exit conduits 136, respectively. In the embodiment depicted in FIG. 1, the electrolyte flows through the electrolyte chambers 114, 116 in parallel; i.e., the electrolyte that flows through one of the chambers 114, 116 is not used by the other chamber 114, 116. However, in alternative embodiments (not shown), the electrolyte may flow through the electrolyte chambers 114, 116 in series; i.e., the electrolyte may flow into one of the electrolyte chambers 114, 116 and, upon exiting this electrolyte chamber, be directed into the other of the electrolyte chambers 114, 116. Oxidation reactions (at the anode 126) and reduction reactions (at the cathode 124) convert the ionic current into electric current and complete the ionic circuit. The anode 126 and the cathode are electrically communicative 124 via an electrical conduit 156, thereby resulting in electrons flowing from the anode 126 to the cathode 124.

Table 1, below, lists exemplary electrolytes that can be used in anode and cathode electrolyte chambers 114, 116, as well as the associated electrochemical reactions and reduction potentials that occur at the anode and cathode 126, 124:

TABLE 1

Exemplary Electrolytes

| Electrolyte | | Half Cell Reaction | Standard Reduction Potential (V) |
|---|---|---|---|
| i. $Na_2SO_4$ (aq) | Anode | $2H_2O \rightleftarrows O_2 (g) + 4H^+ + 4e^-$ | −1.23 |
| By-products: $H_2$ | Cathode | $4H_2O + 4e^- \rightleftarrows 2H_2 (g) + 4 OH^-$ | −0.83 |
| (g) & $O_2$ (g) | Net | $4H_2O \rightleftarrows 2H_2 (g) + O_2 (g)$ | −2.06 |
| ii. NaCl (aq) | Anode | $4Cl^- \rightleftarrows 2Cl_2 + 4e^-$ | −1.36 |
| By-products: $Cl_2$ | Cathode | $4H2O + 4e- \rightleftarrows 2H2 (g) + 4 OH-$ | −0.83 |
| (g) & NaOH (aq) | Net | $4H2O \rightleftarrows 2H2 (g) + 2Cl2 (g) + 4OH-$ | −2.16 |
| iii. NaOH (aq) | Anode | $4OH^- \rightleftarrows 2H_2O + O_2 (g) + 4e^-$ | −0.40 |
| | Cathode | $4H_2O + 4e^- \rightleftarrows 2H_2 (g) + 4OH^-$ | −0.83 |
| | Net | $2H_2O \rightleftarrows 2H_2 (g) + O_2 (g)$ | −1.23 |
| iv. HCl (aq) | Anode | $2H_2O \rightleftarrows O_2 (g) + 4H^+ + 4e^-$ | −1.23 |
| | Cathode | $2H^+ + 2e^- \rightleftarrows H_2 (g)$ | 0.00 |
| | Net | $2H_2O \rightleftarrows 2H_2 (g) + O_2 (g)$ | −1.23 |
| v. HCl (aq) with | Anode | $H_2 (g) \rightleftarrows 2H^+ + 2e^-$ | 0.00 |
| gas diffusion | Cathode | $2H^+ + 2e^- \rightleftarrows H_2 (g)$ | 0.00 |
| anode | Net | — | 0.00 |
| vi. $Na_3Fe(CN)_6$ | Anode | $Fe(CN)_6^{4-} \rightleftarrows Fe(CN)_6^{3-} + e^-$ | −0.36 |
| (aq) or $K_3Fe(CN)_6$ | Cathode | $Fe(CN)_6^{3-} + e^- \rightleftarrows Fe(CN)_6^{4-}$ | 0.36 |
| (aq) and $Na_4Fe(CN)_6$ (aq) or $K_4Fe(CN)_6$ in bulk of NaCl(aq) | Net | — | 0.00 |
| vii. $Na_2S_4O_6$ (aq) | Anode | $S_2O_3^{2-} \rightleftarrows S_4O_6^{2-} + 2e^-$ | −0.08 |
| and $Na_2S_2O_3$ (aq) | Cathode | $S_4O_6^{2-} + 2e^- \rightleftarrows S_2O_3^{2-}$ | 0.08 |
| | Net | — | 0.00 |

Exemplary anode and cathode materials include substrate metals such as titanium, niobium, tantalum, iridium, palladium, stainless steel, steel, nickel and graphite; the substrate metals may be optionally coated with platinum, ruthenium, iridium, or a mixed metal oxide combination of any two or more of platinum, ruthenium, and iridium.

Notably, the choice of which type of ion exchange membrane ("stack end membrane 158") is used to separate the diluent and concentrate chambers 112, 110 from the electrolyte chambers 114, 116 is important. The stack end membrane 158 nearest to the anode 126 is hereinafter referred to as the "anode stack end ion exchange membrane" and the stack end membrane 158 nearest to the cathode 124 is hereinafter referred to as the "cathode stack end ion exchange membrane". The anode electrolyte chamber 114 is bounded on one side by and is in ionic communication with the anode stack end ion exchange membrane, and the cathode electrolyte chamber 116 is also bounded on one side by and is in ionic communication with the cathode stack end ion exchange membrane. As electrochemical reactions occur at the anode 126 and the cathode 124, the anode electrolyte chamber 114 is bounded on another side by and is in electrical communication with the anode 126, and similarly the cathode electrolyte chamber 116 is bounded on another side by and is in electrical communication with the cathode 124. In an embodiment that uses $Na_2SO_4$ as an electrolyte, for example, cation exchange membranes 122 are used as stack end membranes 158. This is because $Na_2SO_4$ is composed of $Na^+$ cations and $SO_4^{2-}$ anions. By using cation exchange membranes 122, only the $Na^+$ cations can travel between the electrolyte chambers 114, 116 into the adjacent diluent and concentrate chambers 112, 110. As the diluent and concentrate are both saltwater, none of the electrolyte, diluent, or concentrate becomes polluted with new types of ions. Similarly, if HCl were used as an electrolyte, anion exchange membranes would typically be used to separate the electrolyte chambers 114, 116 and the diluent and concentrate chambers 112, 110.

In an alternative embodiment (not shown), the diluent and the concentrate can flow through the dialytic stack 101 in opposite, or countercurrent, directions. Doing so can help to maintain a more even concentration difference between the diluent and concentrate chambers 112, 110.

Figure 2:
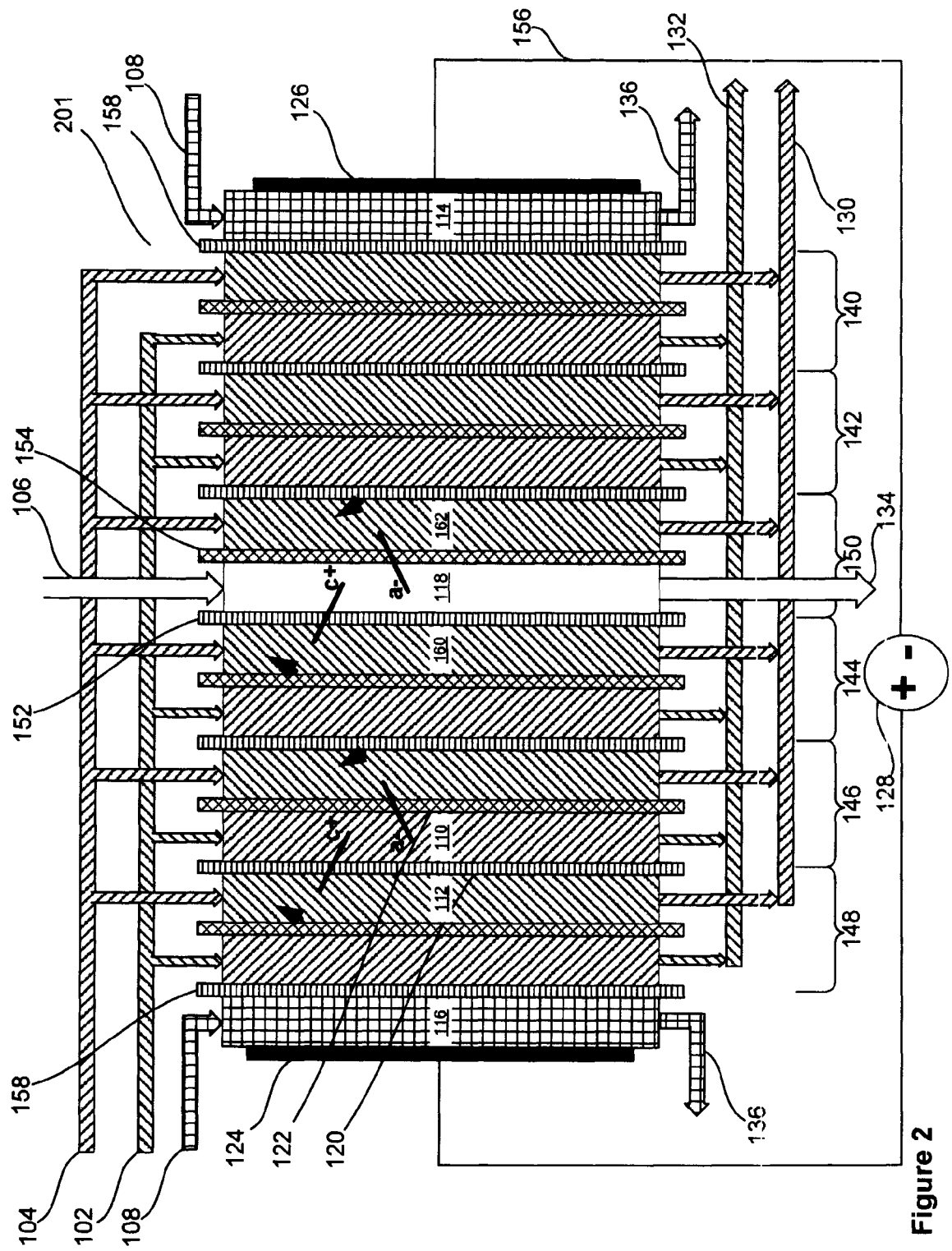
FIG. 2 is a schematic view of a dialytic stack for desalinating saltwater according to a second embodiment wherein the dialytic stack operates in "reverse polarity"

Referring now to FIG. 2, there is depicted a second embodiment of a dialytic stack 201 that is configured to have a polarity opposite that of the first embodiment of the dialytic stack 101 depicted in FIG. 1. The dialytic stack 201 of FIG. 2 is similar to the dialytic stack 101 of FIG. 1, with the exceptions being that the product chamber 118 and anion and cation discharge chambers 162, 160 have been shifted one chamber to the right, the chamber that formerly served as the anion discharge chamber 162 has been replaced with a concentrate chamber 110, and the remaining diluent and concentrate chambers 112, 110 have been swapped. The result is a change of polarity of the drive voltage and, consequently, a change in direction of ion migration. Although FIG. 2 shows the product chamber 118 and anion and cation discharge chambers 162, 160 having been shifted only one chamber to the right relative to the embodiment depicted in FIG. 1, these chambers could have been shifted any odd number of chambers to the right or left.

Useful by-products may be created from the electrochemical reactions occurring at the anode and cathode 126, 124 depending on the electrolytes used in the dialytic stacks 101, 201 depicted in FIGS. 1 and 2. For example, when the electrolyte used is aqueous NaCl, $Cl^-$ anions are oxidized to $Cl_2$ gas (see Table 1, row ii, above). $Cl_2$ gas can, for example, be used to treat water via chlorination. Alternatively, if aqueous HCl were used as an electrolyte, $H_2$ gas would be produced at the cathode 124 (see Table 1, row v, above) and could be subsequently used to produce power in fuel cells, for example. Other potential useful by-products from the oxidation-reduction reactions occurring in the electrolyte chambers 114, 116 include oxygen gas when using an electrolyte of $Na_2SO_4$, NaOH or HCl; and sodium hydroxide when using NaCl as an electrolyte.

Figure 3:
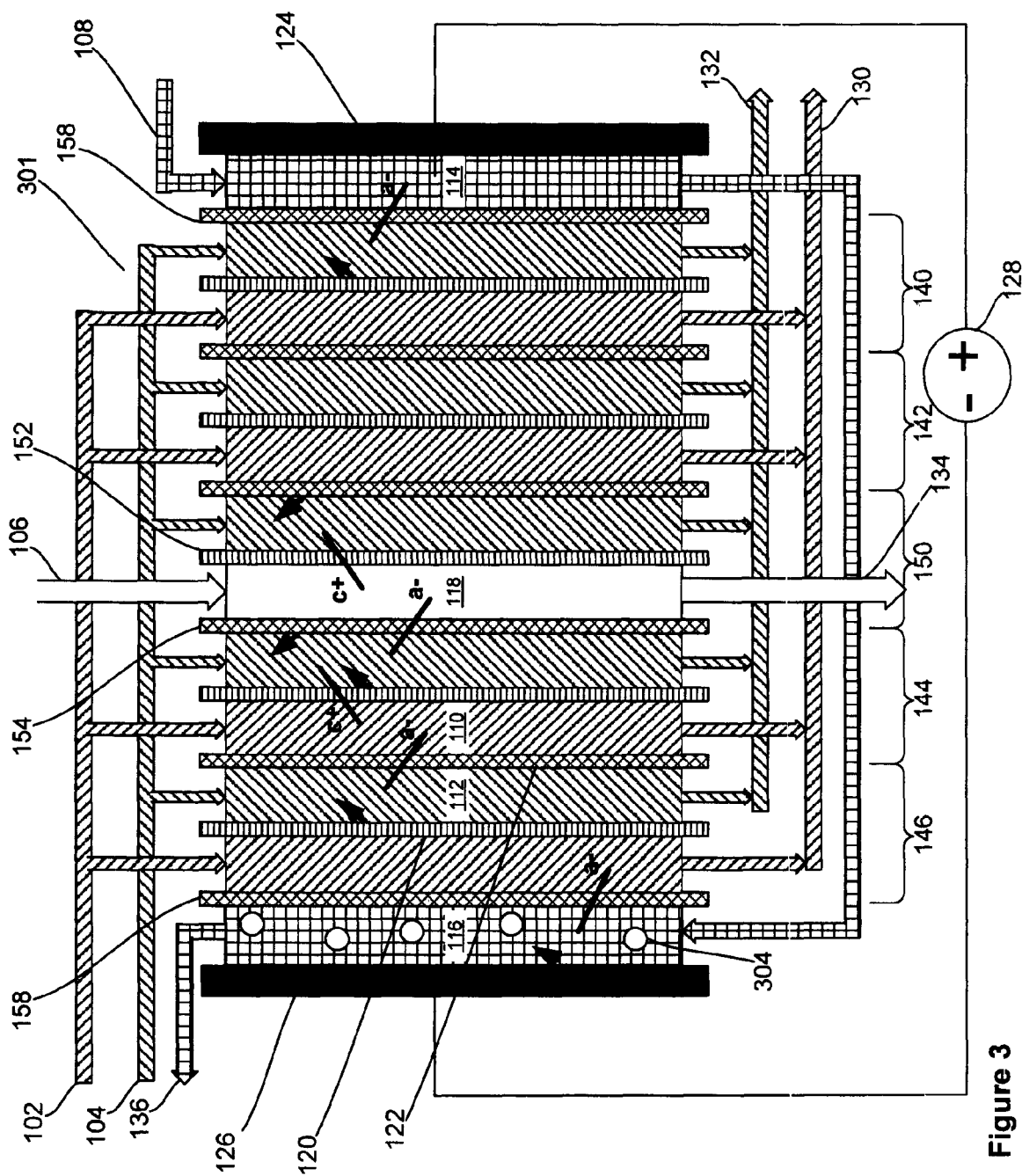
FIG. 3 is a schematic view of a dialytic stack for desalinating saltwater according to a third embodiment wherein the dialytic stack employs electrolyte recirculation using gas diffusion electrodes.

FIG. 3 depicts a third embodiment of a dialytic stack 301 that pumps the electrolyte from one of the anode and cathode electrolyte chambers 114, 116 to the other of the anode and cathode electrolyte chambers 114, 116 such that electrochemical reaction by-products formed in one of the anode and cathode electrolyte chambers 114, 116 can be used as a reactant in the other of the electrolyte chambers 114, 116. The dialytic stack 301 uses gas diffusion electrodes for the anode 126 and cathode 124 and circulates via pumping the electrochemical reaction by-products from one of the anode 126 or cathode 124 to the other of the anode 126 or cathode 124 for use as a reactant in an electrochemical reaction and oxidation or reduction back to its original form. This theoretically reduces the net voltage required for the electrochemical reactions to zero. For example, in the dialytic stack 301 of FIG. 3, an aqueous mixture of HCl and NaCl can be used as the electrolyte in the electrolyte chambers 114, 116, and the stack end membranes 158 are anion exchange membranes 122. At the cathode 124, hydrogen ions are reduced to hydrogen gas, which is forced to flow to the anode 126 where the hydrogen gas is again oxidized to hydrogen ions. The hydrogen ions can then be recirculated back to the cathode 124 via a pump (not shown) where they are again reduced to hydrogen gas. The gas diffusion electrodes that are used can be made using the same substrate and coating materials as described above, and are configured to provide sufficient resident time for the gas to be oxidized or reduced at the anode 126 or cathode 124, respectively. Notably, the by-products of the electrochemical reactions need not be gaseous. For example, an aqueous mixture of $Na_3Fe(CN)_6$ and $Na_4Fe(CN)_6$ can be used as an electrolyte, which results in $Fe(CN)_6^{4-}$ being oxidized to $Fe(CN)_6^{3-}$ at the anode 126, which can then be circulated to the cathode 124 for reduction back to $Fe(CN)_6^{4-}$.

In the embodiment depicted in FIG. 3, then, the five drive cells 140, 142, 144, 146, 148 generate a total of about 0.20 Volts. Assuming that $Na_3Fe(CN)_6$ and $Na_4Fe(CN)_6$ are used as electrolytes, the net electrode reduction potential that needs to be overcome for the oxidation-reduction reactions to occur is 0 Volts (see Table 2, row vi). The desalination voltage of the desalination cell 150 is about 0.088 Volts. For a dialytic stack that uses Neosepta AFN and CM-1 ion exchange membranes, has a product chamber 118 that is 0.02 cm thick and has diluent and concentrate chambers 112, 110 that are each 0.05 cm thick, the five drive cells 140, 142, 144, 146, 148 generate a net drive voltage of 0.20 Volts. The product chamber 118 has a desalination voltage of 0.088 Volts and the net electrode reduction potential is 0 Volts; consequently, the resulting stack open circuit voltage is 0.20 Volts−0.088 Volts=0.112 Volts. In this embodiment, the ion exchange membranes and the diluent, concentrate and product feed contribute stack resistive losses of $43\Omega/cm^2$, which results in an ionic current of $2.6 mA/cm^2$. Sufficient drive voltage exists to desalinate the product feed in the product chamber 118. The cations and anions in the product feed are driven out of the product chamber 118, through the product chamber cation and anion exchange membranes 152, 154, respectively, and into the anion and cation discharge chambers 162, 160. The product solution that exits the dialytic stack 101 has a salt concentration of about 0.04% salt by mass and is drinkable. If an external voltage is needed to effect desalination, it can be supplied by a voltage source 128, which is electrically coupled to the electrical conduit 156.

Instead of utilizing the voltage source 128 to supply any additional voltage, additional drive cells may be added to the dialytic stack 101 until a sufficient cumulative drive voltage is achieved to effect desalination. If enough drive cells are added such that voltage in excess of that required for desalination is produced, the dialytic stack 101 may also act as a power source. In such a case, an electrical load can be powered by electrically coupling it between the anode 126 and cathode 124.

Figure 4:
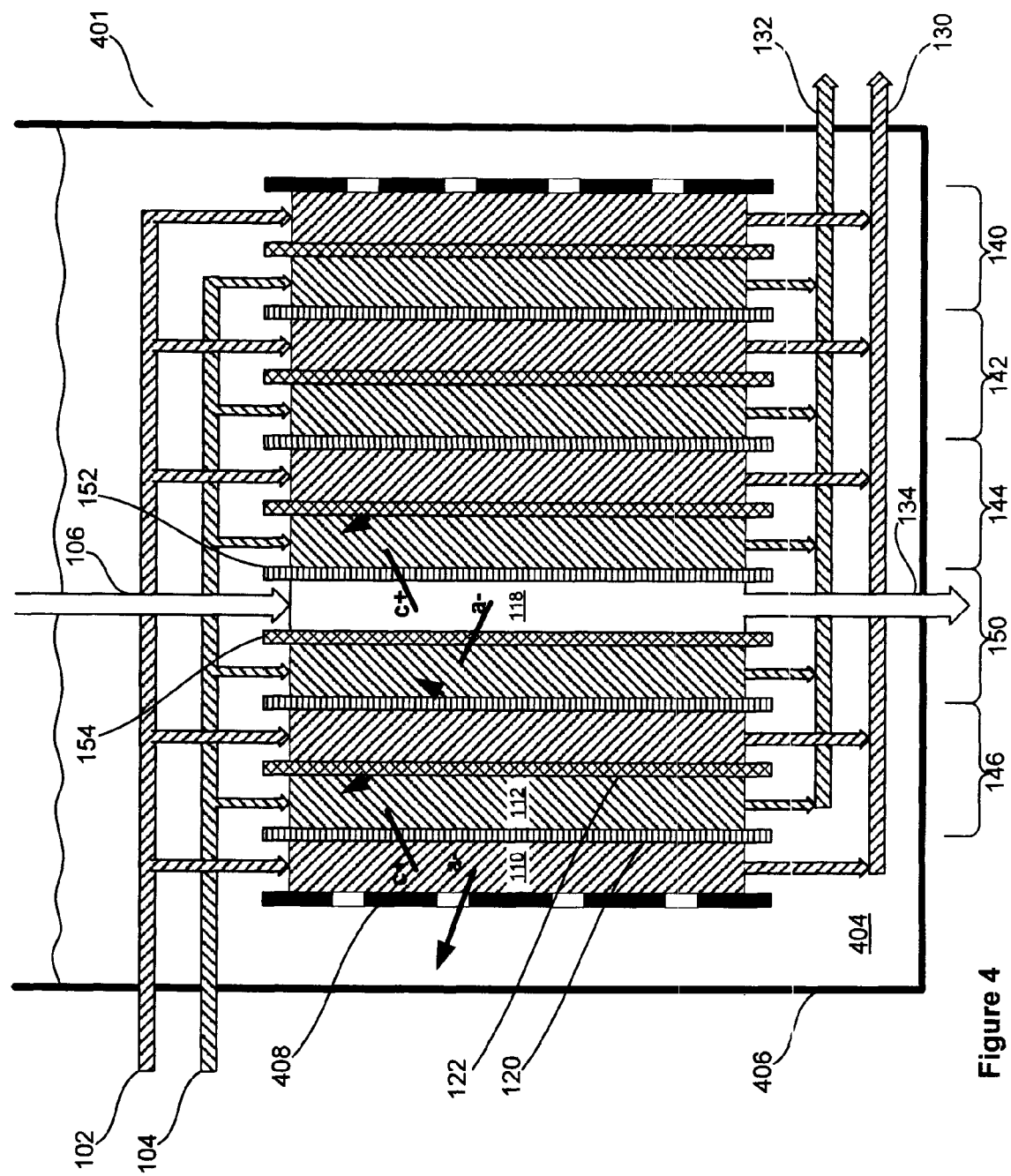
FIG. 4 is a schematic view of a dialytic stack for desalinating saltwater according to a fourth embodiment wherein the dialytic stack is configured to be submerged within a conductive bath.

Referring now to FIG. 4, there is depicted another embodiment of a dialytic stack 401 wherein the ionic circuit is completed via fluid circulation by submerging the dialytic stack 401 in a conductive bath 404 that is contained within a storage vessel 406. The bath 404 may be, for example, composed of concentrate. Beneficially, and in contrast to completing the ionic circuit electrochemically as is done in the embodiments illustrated in FIGS. 1 to 3, completing the ionic circuit via fluid circulation does not require an anode, cathode or power supplies. Additionally, no external power must be supplied to overcome the standard reduction potential of the electrochemical reactions that take place when the ionic circuit is completed electrochemically, thereby reducing the drive voltage that is required to desalinate the product.

The dialytic stack 401 of FIG. 4 does not have an anode or a cathode. Instead, the diluent chambers 112 and concentrate chambers 110 of the dialytic stack 401 are sandwiched between porous first and second end plates 408, which can be made of non-conductive material such as polypropylene. Immediately adjacent to the end plates 408 are concentrate chambers 110, which act as first and second electrolyte chambers for containing an electrolyte which, in this particular embodiment, is concentrate. The first electrolyte chamber is bounded on one side by and is in ionic communication with the porous first end plate and is bounded on another side and is in ionic communication with a first ion exchange membrane (the leftmost cation exchange membrane 120 in FIG. 4); the second electrolyte chamber is bounded on one side by and is in ionic communication with the porous second end plate and is bounded on another side by and is in ionic communication with a second ion exchange membrane (the rightmost anion exchange membrane 122 in FIG. 4). These first and second electrolyte chambers ionically communicate with the remainder of the diluent and concentrate chambers 112, 110 via first and second ion exchange membranes, respectively (the leftmost cation exchange membrane 120 and rightmost anion exchange membrane 122 in FIG. 4). In the dialytic stack 401 as illustrated in FIG. 4, anions migrate from right to left and cations migrate from left to right. Consequently, cations are drawn into the dialytic stack from the conductive bath 404 near the porous end plate 408 on the left of the dialytic stack 401 and anions are drawn into the dialytic stack 401 from the conductive bath 404 near the porous end plate 408 on the right side of the dialytic stack 401. The deeper and wider the conductive bath 404 and the higher its concentration, the lower the resistance encountered by the migrating ions. In practice, all of the diluent and concentrate chambers 112, 110 in the dialytic stack 401 are sealed such that no fluid transfer occurs between the bath 404 and the chambers 112, 110.

In an alternative embodiment (not shown), instead of submerging the dialytic stack 401 within the conductive bath 404, the first and second electrolyte chambers are filled with concentrate. These concentrate chambers are fluidly coupled to each other via an electrolyte chamber fluid conduit. In this alternative embodiment, the end plates 408 are not porous. Forced circulation can be provided via pumping to circulate concentrate from one of the concentrate chambers to the other, thereby completing the ionic circuit.

Figure 5:
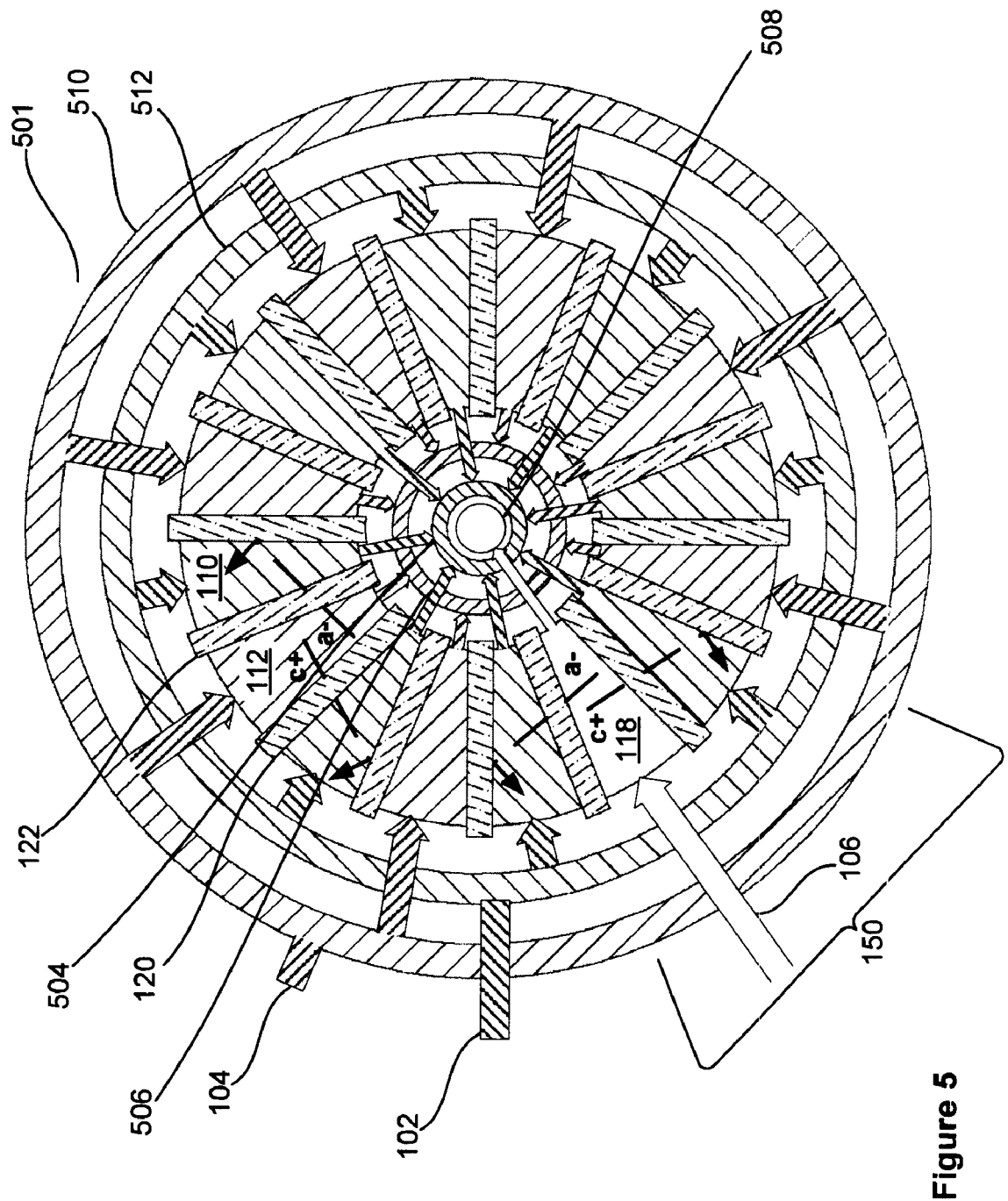
FIG. 5 is a schematic view of a ring-shaped dialytic arrangement of cells for desalinating saltwater.

Referring now to FIG. 5, there is shown a dialytic arrangement of cells in a ring configuration ("dialytic ring" 501). The dialytic ring 501 in FIG. 5 includes a concentrate supply manifold 510 and a diluent supply manifold 512, which receive concentrate and diluent from concentrate and diluent supply conduits 104 and 102, respectively. Diluent and concentrate are then conveyed to diluent and concentrate chambers 112, 110 which are fluidly coupled to the diluent and concentrate supply manifolds 512, 510 and which, as in the aforedescribed embodiments, are separated from each other by a series of alternating cation and anion exchange membranes 120, 122. Product feed is delivered directly to product chamber 118 from the product feed supply conduit 106. Advantageously, cations and anions migrate in opposite directions around the dialytic ring 501, thereby achieving desalination of a given volume of product feed. Compared to a dialytic stack 401 having the same number and average thickness of chambers 110, 112, 118, the distance migrating anions and cations have to travel in the dialytic ring 501 is less than the distance they have to travel in the dialytic stack 401, and therefore the ionic resistance of the dialytic ring 501 is less than the ionic resistances of the dialytic stack 401. Consequently, if the dialytic ring 501 and the dialytic stack 101, 201, 301 have the same number of chambers 110, 112, 118 of the same average thickness, resistive losses will be lower in the dialytic ring 501 than in the dialytic stacks 101, 201, 301. In addition, electrodes are not required in the dialytic ring 501.

The dialytic ring 501 of FIG. 5 has seven drive cells and one desalination cell 150. As with the embodiment of the dialytic stack wherein the ionic circuit is completed using fluid circulation, no energy is needed to drive any electrochemical reactions. Consequently, assuming a concentrate concentration of about 18% and a diluent concentration of about 3.5%, the seven drive cells provide a cumulative drive voltage of 0.28 Volts, which is well in excess of the voltage needed to desalinate the product feed to about 0.04% salt by mass (approximately 0.088 Volts plus the voltage drop due to parasitic resistive losses). Following desalination, the product exits the dialytic ring 501 via a product exit manifold 508, the diluent exits the dialytic ring 501 via a diluent exit manifold 504, and the concentrate exits the dialytic ring 501 via a concentrate exit manifold 506.

Figure 6:
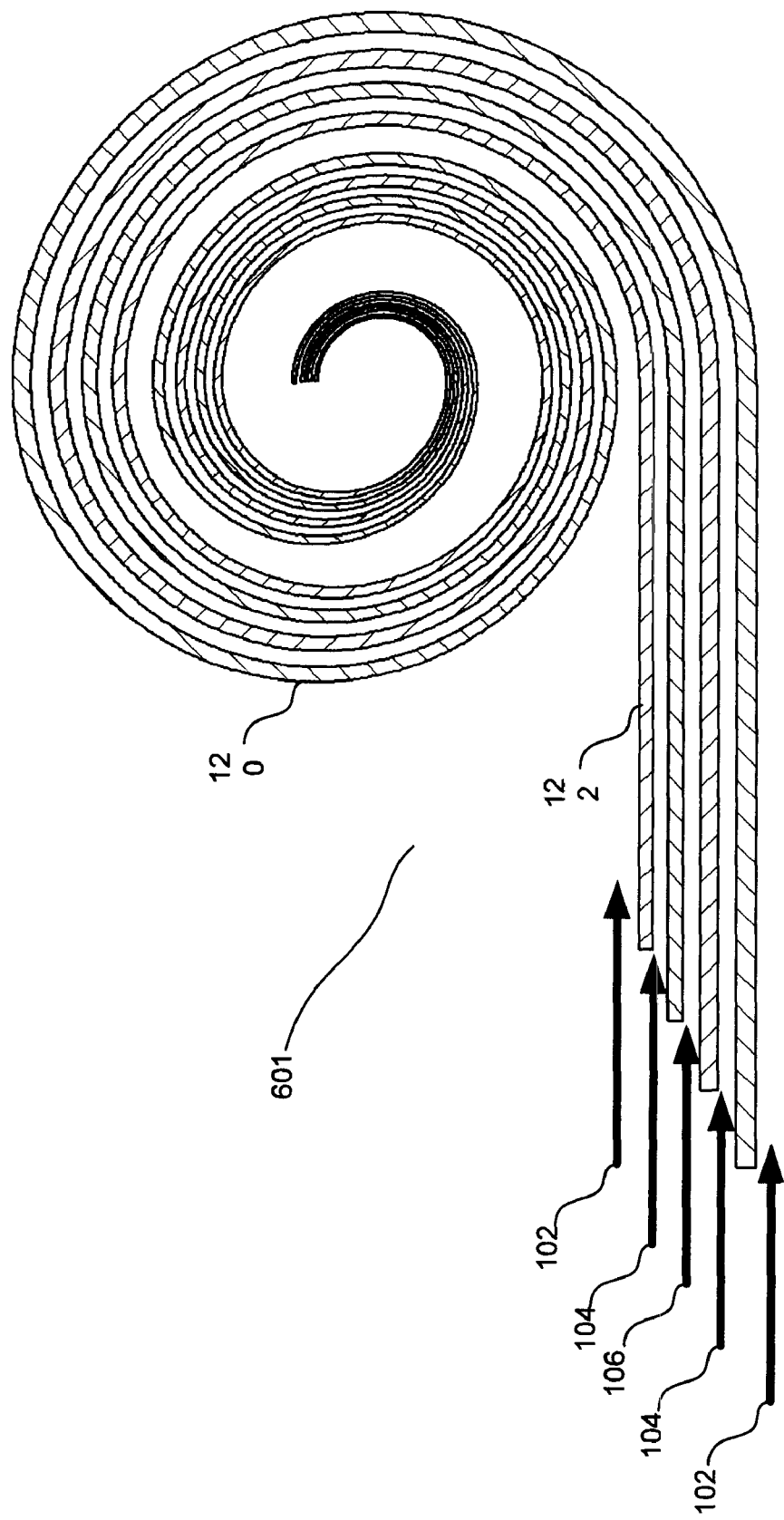
FIG. 6 is a schematic view of a spiral-shaped dialytic arrangement of cells for desalinating saltwater.

Referring now to FIG. 6, there is depicted a dialytic arrangement of cells in a spiral configuration ("dialytic spiral 601"). As in previous embodiments, the dialytic spiral 601 is composed of an alternating arrangement of cation and anion exchange membranes 120, 122. Product feed, diluent and concentrate can be supplied to the gaps between the alternating ion exchange membranes 120, 122 through supply conduits 102, 104, 106. The dialytic spiral 601 can be created by, for example, arranging the ion exchange membranes 120, 122 along with chamber spacers and gaskets flat on a surface and then rolling them as depicted in FIG. 6. Beneficially, rolling the membranes 120, 122 aids in high volume manufacturing; and reduces exposure of sealing surfaces, which reduces the likelihood that the spiral 601 will leak. Production techniques are similar to those used in spirally wound reverse osmosis modules, such as the DOW™ 210 EDI module.

Figure 7:
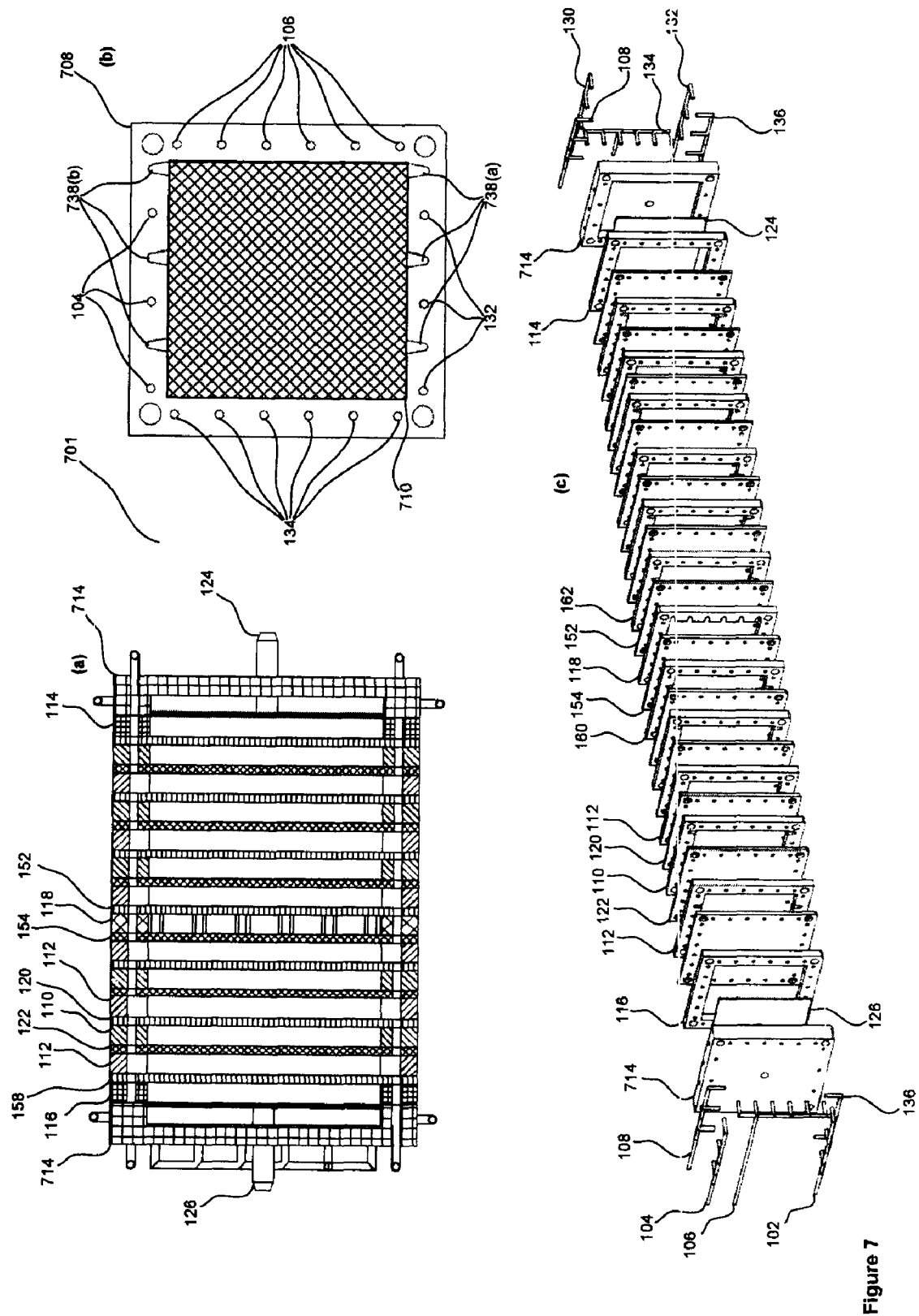
FIGS. 7(a) and (c) are sectional and exploded views, respectively, of a unipolar dialytic stack in which assembly of various fluid chambers within the dialytic stack and manifolding are illustrated.
FIG. 7(b) is a front elevation view of a gasket that circumscribes the various fluid chambers contained within the dialytic stack.

Referring now to FIGS. 7(*a*) and (*c*), there are depicted sectional and exploded views of a unipolar dialytic stack 701 that can be used to desalinate saltwater. By "unipolar", it is meant that the direction of ionic movement in the dialytic stack 701 is not reversible during operation. FIG. 7(*a*) is a sectional view of the dialytic stack 701 having an alternating arrangement of diluent and concentrate chambers 112, 110. The anion exchange membrane 122 forms a shared boundary and is in ionic communication with adjacent diluent and concentrate chambers 112, 110 of any given drive cell; the cation exchange membrane 120 forms a shared boundary between and is in ionic communication with any given drive cell and an adjacent drive cell. The product chamber 118 is disposed within the dialytic stack 701 and is bounded on one side by and is in ionic communication with the product chamber anion exchange membrane 154, and is bounded on another side by and is in ionic communication with the product chamber cation exchange membrane 152. The anode and cathode 126, 124 and anode and cathode electrolyte chambers 116, 114 are disposed on either end of the dialytic stack 701. Between the anode electrolyte chamber 116 and the drive cells and product chamber 118 are the stack end membranes 158 in the form of the anode and cathode stack end ion exchange membranes. The anode electrolyte chamber 116 is bounded on one side by and is in ionic communication with the anode stack end ion exchange membrane and is bounded on another side by and is in electrical communication with the anode 126. The anode electrolyte chamber 116 is ionic communication with the drive cells and the product chamber 118 via the anode stack end ion exchange membrane. Similarly, the cathode electrolyte chamber 114 is bounded on one side by and is in ionic communication with the cathode stack end ion exchange membrane and is bounded on another side by and is in electrical communication with the cathode 124. The cathode electrolyte chamber is in ionic communication with the drive cells and product chamber 118 via the cathode stack end ion exchange membrane. The anode and cathode, ion exchange membranes and diluent, concentrate and product chambers are sandwiched between two end plates 714.

Referring now also to FIG. 7(*b*), there is depicted a front elevation view of a gasket 708 having a spacer 710 that is used as part of a manifolding assembly that includes diluent manifolding configured to convey diluent to and away from the diluent chambers 112, concentrate manifolding to convey concentrate to and away from the concentrate chambers 110, and product manifolding to deliver the saltwater to be desalinated to and desalinated saltwater away from the product chamber 118. It is advantageous for the chambers to be as thin as practically possible to limit ionic resistance while also promoting fluid flow without an excessive pressure drop. In FIG. 7(*b*), the spacer 710 is a mesh spacer that maintains separation of adjacent ion exchange membranes when the dialytic stack 701 is in operation by preventing adjacent ion exchange membranes from contacting each other as a result of fluid flow through the chambers 110, 112, 118. The spacer 710 can be similar to Industrial Netting's XN-3234 or ON-6200. The gasket 708 can be formed using materials such as ethylene propylene diene M-class rubber (EPDM), silicon, nitrile, santoprene, viton, neoprene, PTFE (Teflon), natural rubber, and PVC. As is evident from FIG. 7(*c*), the gaskets 708 and ion exchange membranes are layered in an alternating series to form the various diluent, concentrate, product, and electrolyte chambers. Each gasket 708 circumscribes a volume that acts as one of the diluent, concentrate or product chambers, and each such chamber is bounded on one side by and in ionic communication with one ion exchange membrane and bounded on another side by and in ionic communication with another ion exchange membrane.

Each gasket 708 has punched through its perimeter a series of holes that make up part of the diluent, concentrate or product manifolding. In FIG. 7(*b*), one side of the gasket 708 has the diluent supply conduits 104 extending therethrough and the opposing side of the gasket 708 has the diluent exit conduits 132 extending therethrough. Similarly, the product feed supply conduits 106 and the product exit conduits 134 extend through opposing sides of the gasket 708. The gasket 708 has a series of inlet notches 738(*a*) extending through one side of the gasket 708, with each inlet notch 738(*a*) being fluidly coupled to the concentrate supply conduit 102, and on an opposing side has a series of outlet notches 738(b) extending therethrough, with each outlet notch 738(b) being fluidly coupled to the concentrate exit conduit 130. The gasket 708 depicted in FIG. 7(b) is thus configured to be a concentrate chamber 110. Only the concentrate supply and exit conduits 102, 130 are fluidly coupled to the concentrate chamber 110 via the inlet and outlet notches 738(a), (b); consequently, any product (or product feed) and diluent passing through the product feed supply conduits 106, product exit conduits 134, diluent supply conduits 104 and diluent exit conduits 132 are sealed from the concentrate chamber 110, while concentrate will flow from the concentrate supply conduits 102, through the inlet notches 738(a), into and through the concentrate chamber 110, and then out through the outlet notches 738(b) on the opposite side of the gasket 708 and into the concentrate exit conduits 130. Similarly, for the gasket that circumscribes the product chamber 118, only notches that fluidly couple the product feed supply and exit conduits 106, 134 to the product chamber 118 are present, and for the gaskets that circumscribe the diluent chambers 112, only notches that fluidly couple the diluent supply and exit conduits 104, 132 to the diluent chamber 112 are present. The gaskets 708 when pressed together to form the dialytic stack 701 form a fluid tight seal, thus securely containing the contents of the diluent, concentrate and product chambers. Additionally, the concentrate supply and exit conduits 102, 130, diluent supply and exit conduits 104, 132 and product feed supply and product exit conduits 106, 134 from various gaskets 708 align together when the gaskets 708 are pressed to form the dialytic stack 701, thus forming the concentrate, diluent, and product manifolding, respectively. Concentrate, diluent and product feed can consequently flow through the concentrate, diluent and product manifolding and be delivered to the concentration, diluent and product chambers 110, 112, 118.

In the depicted embodiment, electrolyte is pumped into and out of electrolyte chambers 114, 116 via conduits 108, 136, respectively.

Figure 8:
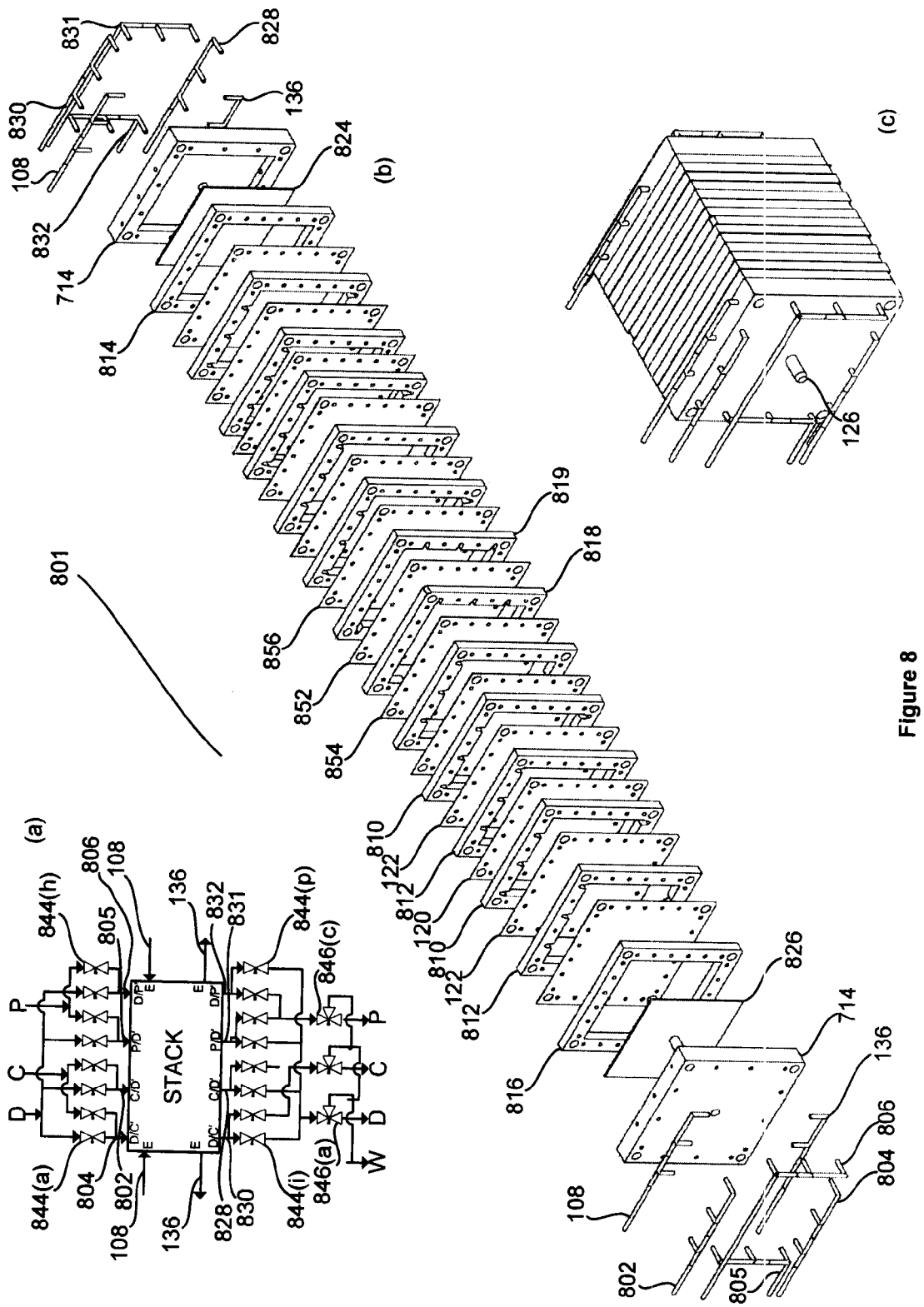
FIGS. 8(a)-(c) are schematic, exploded and perspective views, respectively, of a bipolar dialytic stack operable in both forward and reverse polarities in which assembly of the fluid chambers, manifolding and valves are illustrated.

Referring now to FIG. 8, there are depicted schematic (FIG. 8(a)), exploded (FIG. 8(b)) and perspective (FIG. 8(c)) views of a bipolar dialytic stack 801, in which assembly of the chambers with manifolding and valves is illustrated. By "bipolar", it is meant that the dialytic stack 801 is operable in forward and reverse polarities. In forward polarity, a schematic view of the dialytic stack 801 is the dialytic stack 101 of FIG. 1. In reverse polarity, a schematic view of the dialytic stack 801 is the dialytic stack 201 of FIG. 2. Visible in FIG. 8(a) are sixteen two-way valves, inlet valves 844(a)-(h) and outlet valves 844(i)-(p) that can be configured for both forward polarity and reverse polarity operation. Table 2, below, specifies how these two-way valves 844(a)-(p) are configured in these modes:

TABLE 2

Valve Settings in Forward Polarity and Reverse Polarity Operation

| Valve | Forward Polarity Operation | Reverse Polarity Operation |
|---|---|---|
| 844(a) | Opened | Closed |
| 844(b) | Closed | Opened |
| 844(c) | Closed | Opened |
| 844(d) | Opened | Closed |
| 844(e) | Closed | Opened |
| 844(f) | Opened | Closed |
| 844(g) | Opened | Closed |
| 844(h) | Closed | Opened |
| 844(i) | Opened | Closed |
| 844(j) | Closed | Opened |

TABLE 2-continued

Valve Settings in Forward Polarity and Reverse Polarity Operation

| Valve | Forward Polarity Operation | Reverse Polarity Operation |
|---|---|---|
| 844(k) | Closed | Opened |
| 844(l) | Opened | Closed |
| 844(m) | Closed | Opened |
| 844(n) | Opened | Closed |
| 844(o) | Closed | Opened |
| 844(p) | Opened | Closed |

Referring now to FIG. 8(b) and as with the embodiments of the dialytic stack depicted in FIGS. 1 and 2, the dialytic stack 801 is composed of an alternating series of cation and anion exchange membranes 120, 122. Between the cation and anion exchange membranes 120, 122 are a series of alternating diluent/concentrate chambers 812 and concentrate/diluent chambers 810. The anion exchange membrane 122 forms a shared boundary and is in ionic communication with adjacent diluent/concentrate and concentrate/diluent chambers 812, 810 of any given drive cell; the cation exchange membrane 120 forms a shared boundary between and is in ionic communication with any given drive cell and an adjacent drive cell. Also located within the dialytic stack 801 are a product/diluent chamber 818 and diluent/product chamber 819, which in the depicted embodiment are adjacent to each other. The product/diluent chamber 818 is bounded on one side by and is in ionic communication with a product/diluent chamber anion exchange membrane 854 and bounded on another side by and is in ionic communication with a product/diluent chamber cation exchange membrane 852. Similarly, the diluent/product chamber is bounded on one side by and is in ionic communication with a diluent/product chamber anion exchange membrane 856 and bounded on another side by and is in ionic communication with a diluent/product chamber cation exchange membrane 852. In this particular embodiment, the diluent/product chamber cation exchange membrane 852 and the product/diluent chamber cation exchange membrane 852 are the same ion exchange membrane because the product/diluent and diluent/product chambers 818, 819 are adjacent to each other, although this is not the case when the chambers 818, 819 are not adjacent.

As with the dialytic stack 701, the dialytic stack 801 has a manifolding assembly that includes diluent/concentrate, concentrate/diluent, product/diluent, and diluent/product manifolding respectively configured to convey diluent to and away from the diluent/concentrate chamber 812 and diluent/product chamber 819, concentrate to and away from the concentrate/diluent chamber 810, and the saltwater to be desalinated to and the desalinated saltwater away from the product/diluent chamber 818 when the dialytic stack 801 is operating in forward polarity, and respectively configured to convey diluent to and away from the concentrate/diluent chamber 810 and product/diluent chamber 818, concentrate to and away from the diluent/concentrate chamber 812, and the saltwater to be desalinated to and the desalinated saltwater away from the diluent/product chamber 819 when the dialytic stack 801 is operating in reverse polarity.

As with the dialytic stack 701, the dialytic stack 801 includes gaskets (not labeled in FIG. 8) that each circumscribe a volume that acts as one of the diluent/concentrate, concentrate/diluent, diluent/product, or product/diluent chambers, and each such chamber is bounded on one side by and is in ionic communication with one ion exchange membrane and is bounded on another side by and is in ionic communication with another ion exchange membrane. Structurally, the manifolding assembly of the dialytic stack 801 is identical to that of the dialytic stack 701 with the exception of the addition of an additional diluent/product manifolding to another side of the gaskets used in the dialytic stack 801. Structurally, the diluent/concentrate manifolding, concentrate/diluent manifolding, and product/diluent manifolding correspond to the diluent manifolding, concentrate manifolding, and product manifolding of the dialytic stack 701, respectively. For example, inlet notches fluidly couple diluent/concentrate supply conduits 804 in one of the gaskets of the dialytic stack 801 to the diluent/concentrate chamber 812, thereby allowing the solution flowing through the diluent/concentrate conduit (either diluent or concentrate) to enter the diluent/concentrate chamber 812. Outlet notches fluidly couple the diluent/concentrate chamber 812 to diluent/concentrate exit conduits 830, thereby allowing the solution in the diluent/concentrate chamber 812 to exit the stack 801.

The first and second electrodes 824, 826 and first and second electrolyte chambers 814, 816 are disposed on either end of the dialytic stack 801. The electrodes 824, 826 are both operable as either anodes or cathodes, depending on whether the dialytic stack 801 is operating in forward or reverse polarity. The first electrolyte chamber 814 is bounded on one side by and is in ionic communication with a first stack end ion exchange membrane 858, and is bounded on another side by and is in electrical communication with the first electrode 824. Similarly, the second electrolyte chamber 816 is bounded on one side by and is in ionic communication with a second stack end ion exchange membrane 858, and is bounded on another side by and is in electrical communication with the second electrode 826. The electrodes, ion exchange membranes and various chambers are sandwiched between two end plates 714.

The electrodes 824, 826 can be composed of a substrate and a coating applied thereon. The substrate can be, for example, titanium, niobium, tantalum, iridium, or palladium. The coating can be platinum, ruthenium, iridium, or a mixed metal oxide combination of the three. Alternatively, the electrodes 824, 826 can be sacrificial and deteriorate over time. In such an embodiment, the electrodes 824, 826 can be formed from an uncoated substrate of stainless steel, steel, nickel, copper, or graphite.

Operation of the dialytic stack 801 in forward polarity will now be described. Diluent, concentrate and product feed are supplied through the arrows labeled "D", "C" and "P" in FIG. 7(*a*). Diluent is pumped into the dialytic stack 801 through the valves 844(*a*), 844(*g*) and the diluent/concentrate supply conduits 804 and diluent/product supply conduits 806. The diluent is pumped through the diluent/concentrate and diluent/product manifolding and is delivered to the diluent/concentrate chambers 812 and the diluent/product chamber 819 in the dialytic stack 801. Diluent exits the dialytic stack 801 through the diluent/concentrate exit conduits 830 and diluent/product exit conduits 832 and the valves 844(*i*), 844(*p*). Concentrate is pumped into the dialytic stack 801 through the valve 844(*d*) and concentrate/diluent supply conduit 802. The concentrate is pumped through the concentrate/diluent manifolding and is delivered to the concentrate/diluent chambers 810. The concentrate exits the dialytic stack 801 through concentrate/diluent exit conduit 828 and the valve 844(*l*). Product feed is pumped into the dialytic stack 801 through the valve 844(*f*) and product/diluent supply conduit 805. The product feed is pumped through the product/diluent manifolding and is delivered to the product/diluent chamber 818. The product exits the dialytic stack 801 through product/diluent exit conduit 831 and the valve 844(*n*).

Following exiting the dialytic stack 801, diluent, concentrate and product are diverted through three-way valves 846(*a*)-(*c*). Normally, the valves 846(*a*)-(*c*) are set such that the diluent, concentrate and product are directed along the conduits labeled "D", "C" and "P". The dialytic stack 801 can also be operated in purge mode, in which case the diluent, concentrate and product are all diverted to the "waste" conduit, labeled "W". While transitioning from operation in forward polarity mode to reverse polarity mode or vice versa, the dialytic stack 801 can be temporarily operated in purge mode so as to flush away any unwanted diluent, concentrate and product from the valves and conduits.

When operating in reverse polarity, diluent is pumped into the dialytic stack through the valves 844(*c*), 844(*e*) and the concentrate/diluent supply conduit 802 and the product/diluent supply conduit 805. The diluent is pumped through the concentrate/diluent and product/diluent manifolding and delivered into the concentrate/diluent chambers 812 and the product/diluent chamber 818. The diluent exits the dialytic stack through the concentrate/diluent exit conduit 828, the product/diluent exit conduit 831 and the valves 844(*k*), 844(*m*). Concentrate is pumped into the dialytic stack 801 through the valve 844(*b*) and through the diluent/concentrate supply conduit 804. The concentrate is pumped through the diluent/concentrate manifolding and delivered to the diluent/concentrate chambers 812 and exits the dialytic stack through the diluent/concentrate exit conduit 830 and the valve 844(*i*). Product feed is pumped into the dialytic stack 801 through the valve 844(*h*) and the diluent/product supply conduit 806. The product feed is pumped through the diluent/product manifolding and delivered to the diluent/product chamber 819 and the product exits the dialytic stack through the diluent/product exit conduit 832 and the valve 844(*o*). In both forward and reverse polarities, electrolyte is pumped into and out of end chambers 114, 116 via conduits 108, 136, respectively.

In addition to pumping product feed, diluent and concentrate into the dialytic stack through the valves 844(*a*)-(*h*) and product, diluent and concentrate out of the dialytic stack through the valves 844(*i*)-(*p*) ("forward flow" mode), the flow of solutions within the dialytic stack can also be reversed such that product feed, diluent and concentrate are pumped into the dialytic stack through the valves 844(*i*)-(*p*) and product, diluent and concentrate are pumped out of the dialytic stack through the valves 844(*a*)-(*h*) ("reverse flow" mode). Reverse flow mode can be used to flush the dialytic stack 801. Furthermore, the dialytic stack 801 is able to operate in a mode wherein some of the solutions enter the dialytic stack 801 through the valves 844(*a*)-(*h*) and other solutions enter the dialytic stack through the valves 844(*i*)-(*p*) ("countercurrent flow" mode). For example, when pumping the product feed and diluent into the dialytic stack 801 through the valves 844(*a*), (*f*) and (*h*), concentrate can be fed into the dialytic stack 801 through valve 844(*l*). This allows the diluent and concentrate to flow through the dialytic stack 801 in counter-current directions, which as mentioned above can help to maintain a more even concentration difference between the diluent and concentration chambers 812, 810.

One benefit of being able to run the dialytic stack in both forward and reverse polarities is that periodic reversal of stack polarity can be used to prevent scaling and fouling of the membranes 120, 122 and electrodes 824, 826 and thereby extend the life of the ion exchange membranes 120, 122 and the electrodes 824, 826.

Figure 9:
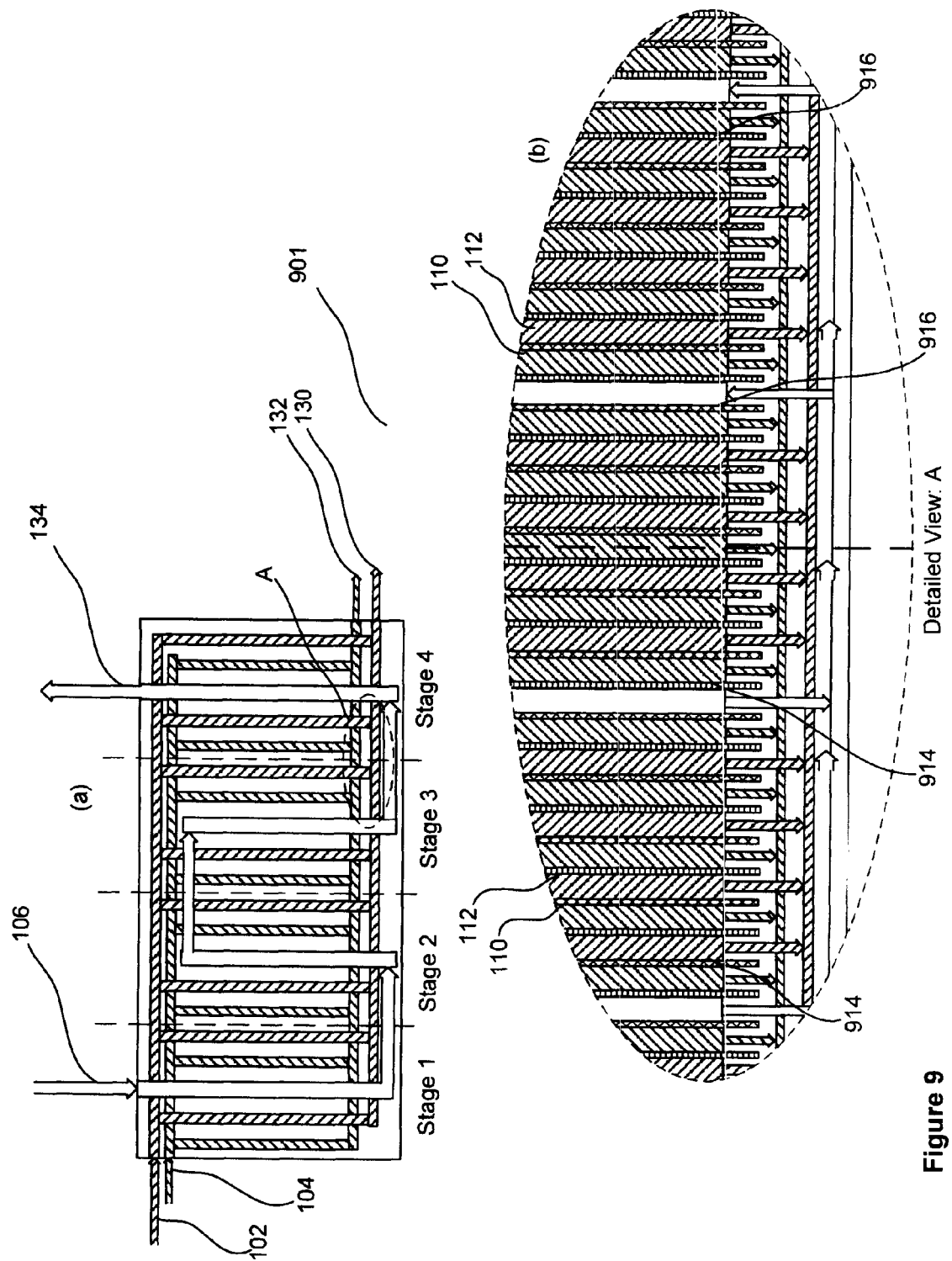
FIGS. 9(a) and (b) are schematic views of a dialytic stack for desalinating saltwater according to a further embodiment wherein the dialytic stack has multiple desalination stages.

Referring now to FIGS. 9(*a*) and (*b*), there is depicted a multi-stage dialytic stack 901. The multi-stage stack 901 has four desalination stages 1-4. Input to the first stage are concentrate, diluent and product feed through the concentrate, diluent and product feed supply conduits 102, 104, 106. Each stage in the dialytic stack 901 purifies the product by a certain percentage such that the product that exits via the product exit conduit 134 is desalinated. As is evident in FIG. 9(*a*), the product flows through adjacent desalination stages in the depicted dialytic stack 901 in opposing directions, although this is not required in all embodiments.

Referring now to FIG. 9(*b*), there is depicted a detailed view of a portion of desalination stages 3 and 4 of the dialytic stack 901. The dialytic stack 901 includes a plurality of drive cells, each of which is composed of a diluent chamber 112 and a concentrate chamber 110 ionically communicative via an ion exchange membrane. Desalination stage 3 also has a plurality of initial stage product chambers 914, each of which is bounded on a first side by and in ionic communication with an initial stage product chamber anion exchange membrane and bounded on another side by and in ionic communication with an initial stage product chamber cation exchange membrane. The output of the initial stage product chambers 914 is directed into a plurality of product chambers in stage 4, subsequent stage product chambers 916, each of which is bounded on a first side by and in ionic communication with a subsequent stage product chamber anion exchange membrane and bounded on another side by and in ionic communication with a subsequent stage product chamber cation exchange membrane. The plurality of product chambers that make up the initial stage product chambers 914 and the plurality of product chambers that make up the subsequent stage product chambers 916 allow product to flow in parallel in any given stage. In any given stage, having multiple product chambers purify saltwater in parallel allows the total volume of product feed that can be handled by the dialytic stack 901 to be increased relative to a dialytic stack 901 that has only a single product chamber per stage. Additionally, incorporating multiple desalination stages into a single stack results in lower capital costs than having a separate stack for each desalination stage. The initial stage and subsequent stage product chambers 914, 916 each have a desalination voltage. Consequently, in order to effect desalination in both the initial stage and subsequent stage product chambers 914, 916 simultaneously, the sufficient voltage that is applied across the product chambers 914, 916 must be greater than or equal to the sum of the desalination voltages of the product chambers 914, 916. This sufficient voltage includes the drive voltage generated by the drive cells and any external voltage applied to the dialytic stack 901.

Although the initial and subsequent desalination stages of FIG. 9 are shown as being desalination stages 3 and 4, the terms "initial desalination stage" and "subsequent desalination stage" refer to any two desalination stages in a dialytic stack wherein the saltwater to be desalinated travels through the initial desalination stage prior to traveling through the subsequent desalination stage; i.e., to any two stages in series communication with each other.

Figure 10:
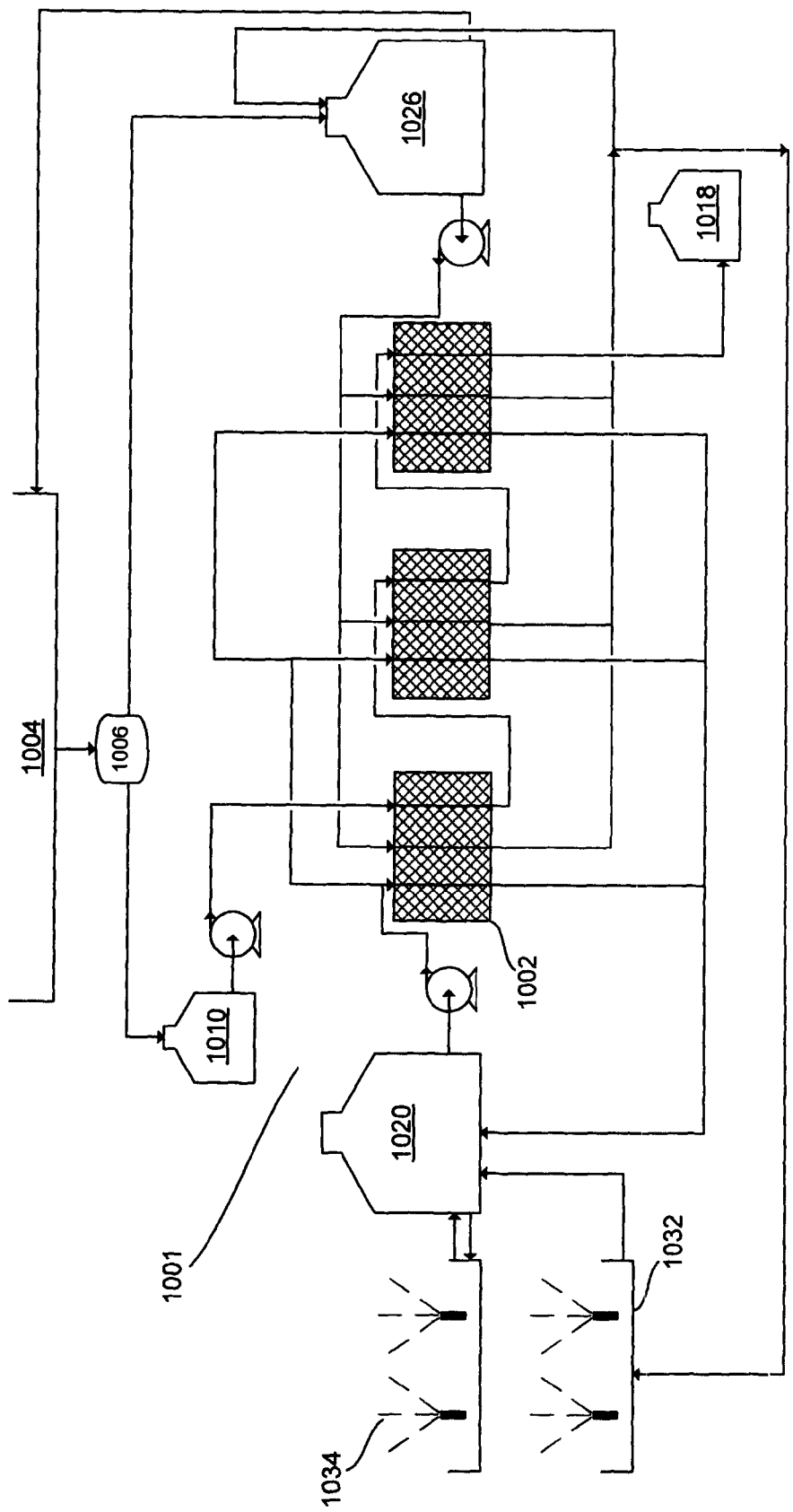
FIG. 10 is a schematic view of a plant that can be used to desalinate saltwater continuously.

Referring now to FIG. 10, there is depicted a plant 1001 that can be used to desalinate saltwater using a continuous flow process. The plant 1001 includes a water source 1004, which can be the ocean or a brackish water supply, for example. Saltwater from the water source 1004 is directed to a pre-treatment system 1006 that treats the saltwater prior to desalination. The pre-treatment system 1006 is designed to remove debris, suspended solids and organic and inorganic matter that can foul, plug or damage the equipment used in the plant 1001. From the pre-treatment system 1006, the treated saltwater is diverted to a saltwater reservoir 1010, which holds product feed that is to be desalinated, and to a diluent reservoir 1026, which holds diluent. In the depicted embodiment, the diluent and the product feed to be desalinated are the same, although this is not a requirement for all embodiments. Also present in the plant 1001 is a concentrate reservoir 1020, for holding concentrate. Concentrate, diluent and product feed from reservoirs 1020, 1026 and 1010 are pumped through a series of three dialytic stacks 1002 in order to desalinate the product feed. Other embodiments could use more or less than three dialytic stacks with the desalination occurring in stages as the product feed passes through the dialytic stacks. The plant 1001 utilizes three dialytic stacks 1002, with product feed flowing through the dialytic stacks 1002 in series and concentrate and diluent flowing through the dialytic stacks 1002 in parallel. Following use in the dialytic stacks 1002, used diluent can be returned to the diluent reservoir 1026 via a valve 1040; back to the water source 1004 via a second valve 1042; and to a first reconcentrator 1032 for generating concentrate from the used diluent, as discussed in more detail below. Used concentrate is returned to a second reconcentrator 1034 for reconcentration prior to storage in the concentrate reservoir 1020, also discussed in more detail below. Product is stored in product reservoir 1018 for retrieval and use. In an alternative embodiment (not shown), used concentrate could be returned to the first reconcentrator 1032 and then to the second reconcentrator 1034, beneficially maintaining a higher concentration in the concentrate reservoir 1020. Also in alternative embodiments (not shown), output from the first reconcentrator 1032 could be conveyed directly into the concentrate reservoir 1020, or used concentrate could be returned directly to the concentrate reservoir 1020 instead of to the second reconcentrator 1034.

Figure 12:
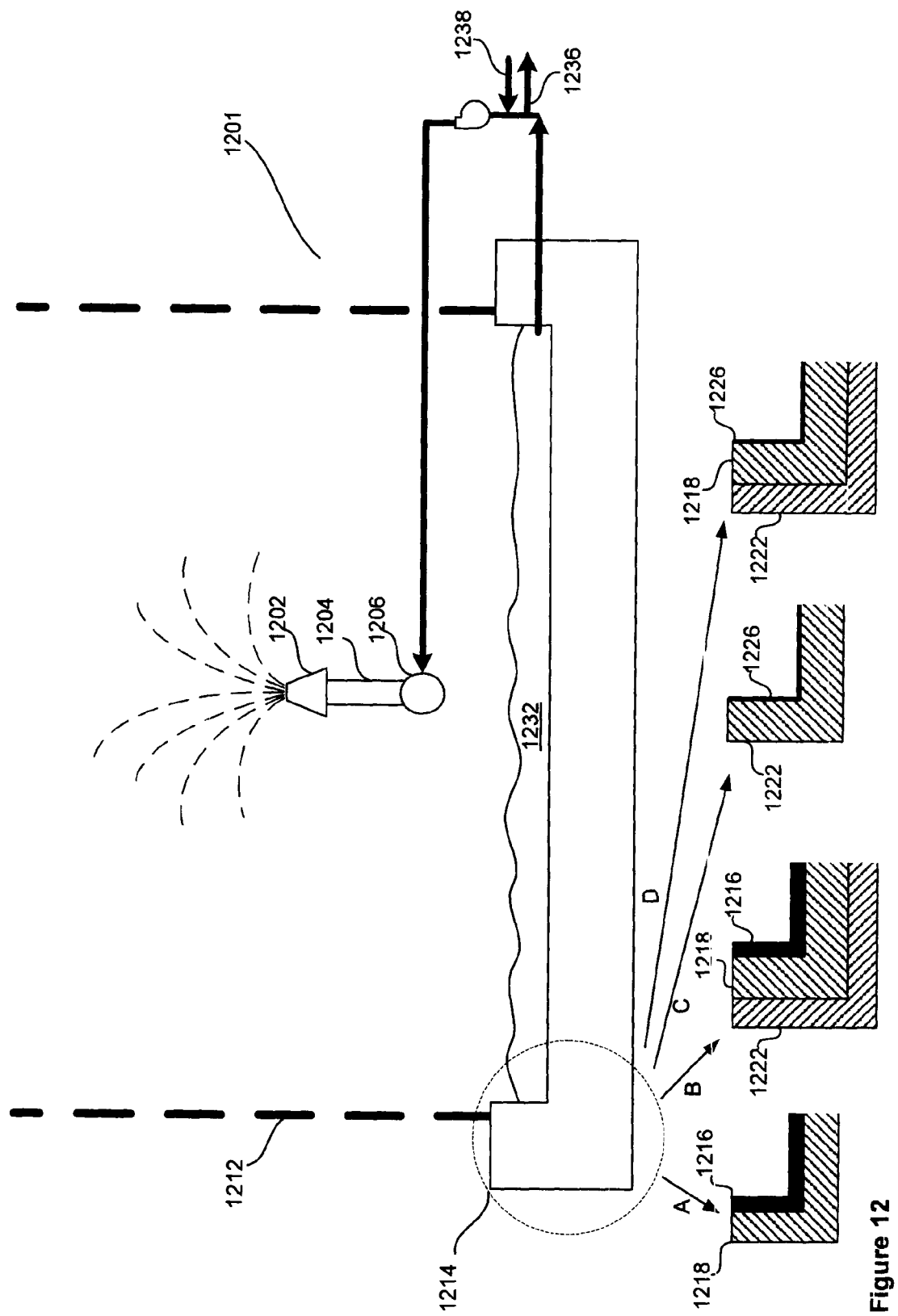
FIG. 12 is a schematic view of an evaporative spray pond.
Figure 13:
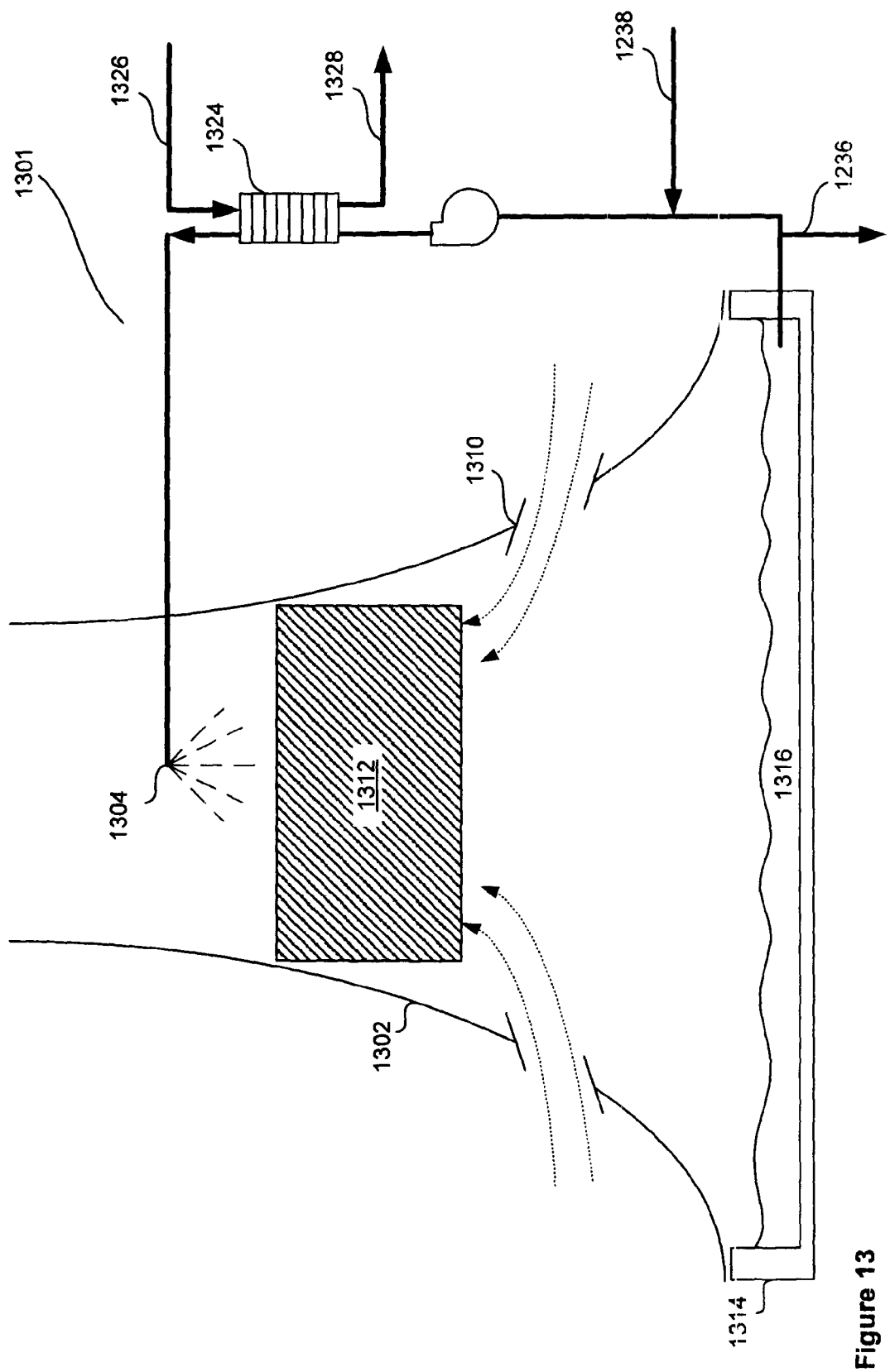
FIG. 13 is a schematic view of a natural draft evaporative tower.
Figure 14:
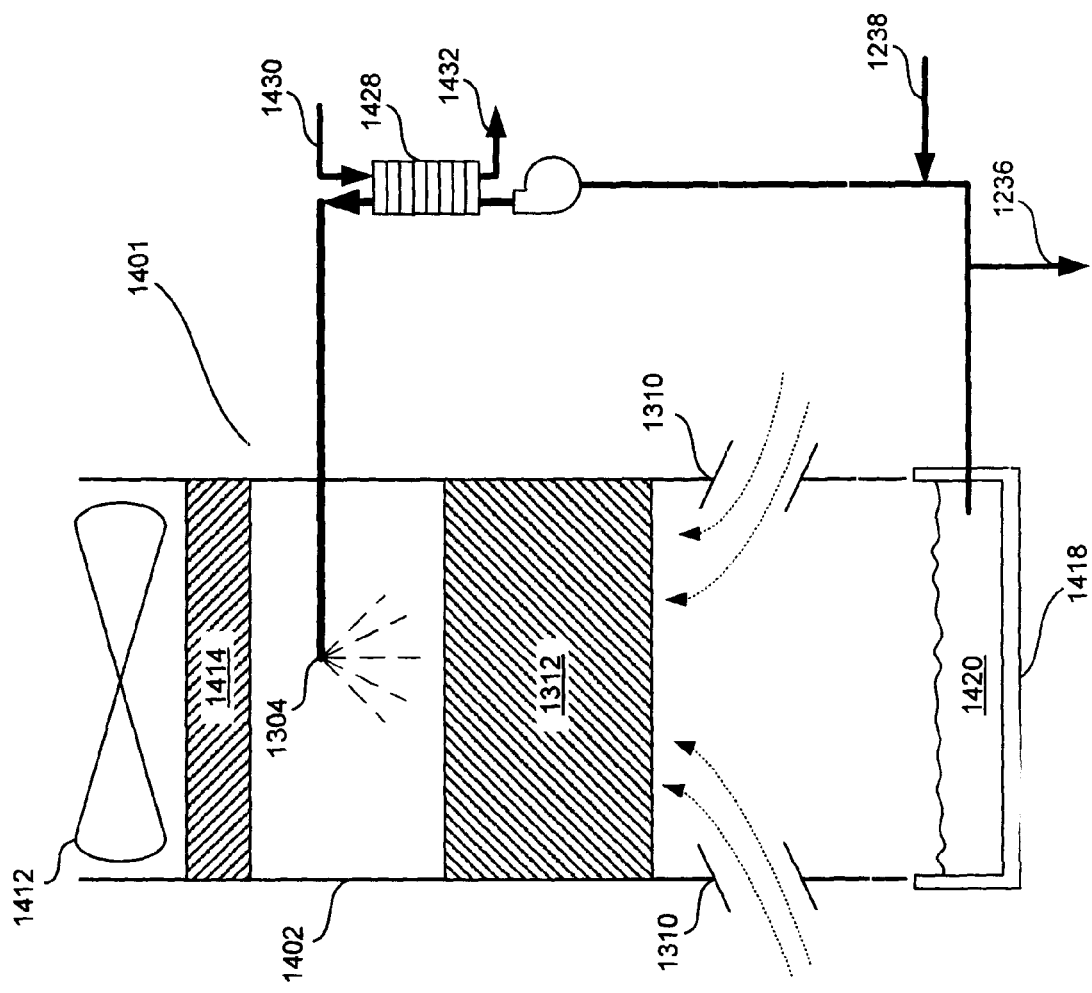
FIG. 14 is a schematic view of a forced draft evaporative tower.

Exemplary first and second reconcentrators 1032, 1034 are depicted in FIGS. 12-14, discussed below. The first reconcentrator 1032 is used to increase the concentration of used diluent prior to transferring the used diluent to the second reconcentrator 1034, which is used to further increase the concentration of the used diluent prior to transferring it into the concentrate reservoir 1020 and to increase the concentration of the solution stored in the concentrate reservoir, if necessary. Both the first and second reconcentrators 1032, 1034 utilize evaporation to the atmosphere for increasing the concentration of saltwater until the saltwater attains a salt concentration suitable for use as concentrate. In one embodiment, solar energy can be directly transferred to the reconcentrators 1032, 1034 (e.g. by having the sun shine on a spray pond 1201, as depicted in FIG. 12) to increase the concentration of saltwater. In alternative embodiments (not depicted), the first and second reconcentrators 1032, 1034 can be fluidly coupled to a heat exchanger 1324 (depicted in FIGS. 13 and 14) which, in turn, obtains heat from an external heat source such as a nearby power or process plant or a solar thermal collector. Low grade thermal energy from a power plant may be, for example, waste heat (such as from a power plant) that may range from about 30 to 150 degrees Celsius. Exemplary heat exchangers are shell and tube, plate, and phase change heat exchangers. The reconcentrators 1032, 1034 may use a combination of energy obtained via the heat exchanger 1324 or directly from the sun to aid in evaporation.

In contrast to known means and methods for desalinating saltwater, the plant 1001 is essentially able to store low grade thermal energy, such as solar energy, in the form of concentrated saltwater; this stored chemical energy is transformed to desalinate the product feed in the dialytic stacks 1002. Notably, areas that are dry and arid and consequently likely to require desalination technology are also those areas that tend to have less humid atmospheres, receive a great deal of solar radiation and therefore have environments in which water readily evaporates. Beneficially, areas in which the plant 1001 is likely to function best are those areas in which the plant 1001 is needed most.

Figure 11:
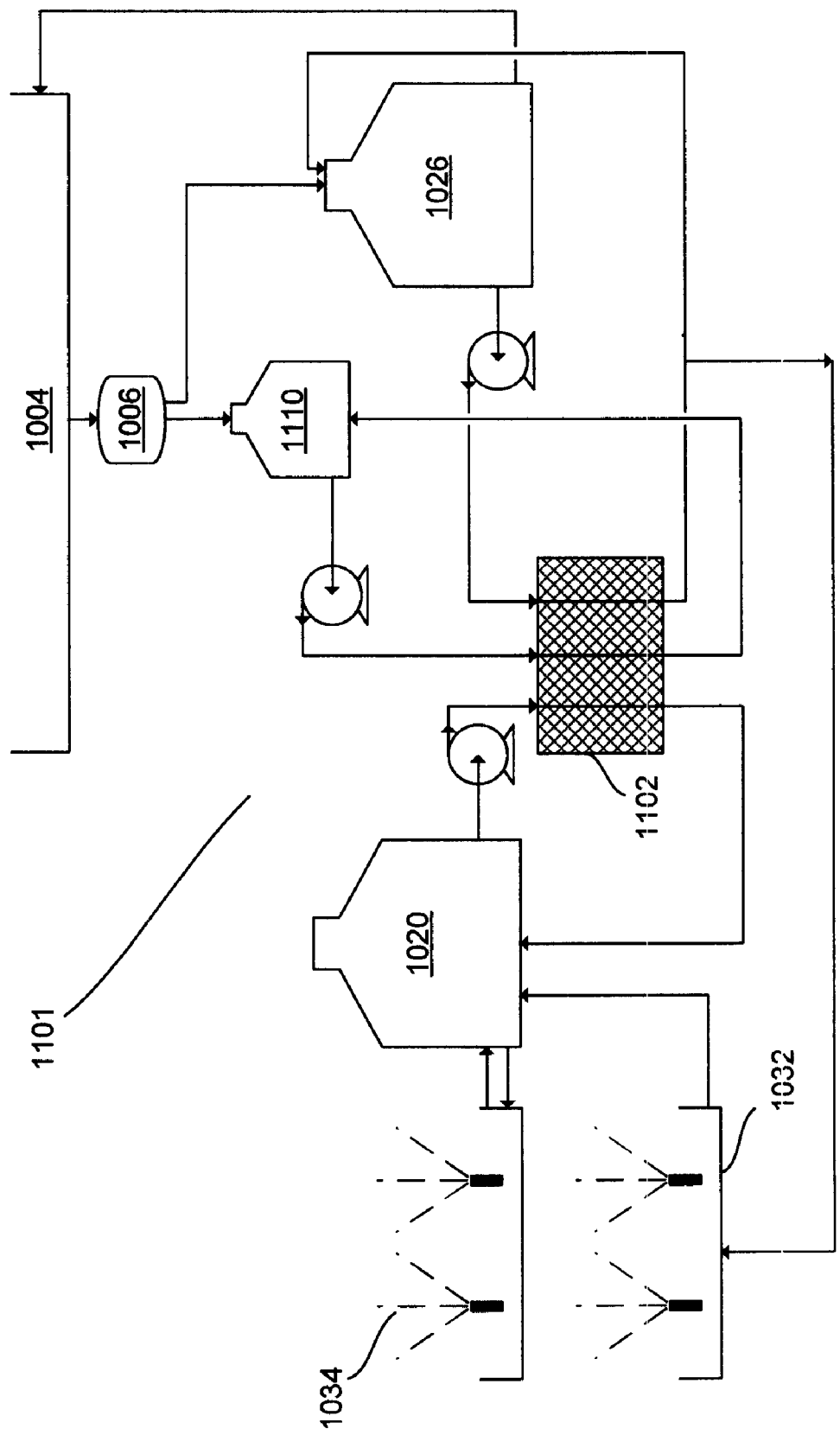
FIG. 11 is a schematic view of a plant that can be used to desalinate discrete batches of saltwater.

Referring now to FIG. 11, there is depicted a second embodiment of a plant 1101 that can be used to desalinate saltwater in a batch flow process. As with the first embodiment of the plant 1001, saltwater is collected from the water source 1004, receives pre-treatment in the pre-treatment system 1006, and is then diverted to a combined saltwater and product reservoir 1110 and the diluent reservoir 1026. Although the plant 1101 uses only one dialytic stack 1102, multiple dialytic stacks could be used as is done in the first embodiment of the plant 1001. In contrast to the first embodiment 1001 of the plant that pumps product feed in series through three dialytic stacks 1002, though, the second embodiment 1101 of the plant does not use the product feed reservoir 1018 of the first plant embodiment 1001 to receive desalinated product. Instead, desalinated product is returned back to the combined saltwater and product reservoir 1110. In this way, a discrete batch of saltwater to be desalinated can be transferred from the water source 1004 and stored in the combined saltwater and product reservoir 1110, which can then be pumped through the dialytic stack 1002 until the water in the combined saltwater and product reservoir 1110 has been sufficiently desalinated. As with the first embodiment of the plant 1001, the reconcentrators 1032, 1034 increase the concentration of saltwater by evaporation to the atmosphere until the saltwater is ready to be used as concentrate.

Referring now to FIGS. 12-14, there are depicted three examples of reconcentrators. FIG. 12 depicts an evaporative spray pond 1201; FIG. 13 depicts a natural draft evaporative tower 1301; and FIG. 14 depicts a forced draft evaporative tower 1401.

The evaporative spray pond 1201 depicted in FIG. 12 includes a pond surface 1214 in which is a shallow layer of pond catchment 1232. The pond catchment 1232 is fluidly coupled to a nozzle header 1206, nozzle riser 1204, and spray nozzle 1202. While only one spray nozzle 1202 is depicted in FIG. 12, the nozzle header 1206 may be coupled to a plurality of spray nozzles 1202. Concentrated seawater can be pumped from the catchment 1232 to the concentrate reservoir 1020 via the fluid conduit 1236; similarly, fluid from the concentrate reservoir 1020 can be pumped to the nozzle header 1206 and sprayed through the spray nozzle 1202 via fluid conduit 1238. Some of the water in the spray emanating from the spray nozzle 1202 will evaporate as the spray falls towards the catchment 1232, thereby increasing the salt concentration of the saltwater in the catchment 1232. A louvred fence 1212 may be used to prevent water droplets from diffusing away from the pond 1212.

Labeled A, B, C and D in FIG. 12 are four different ways in which the pond surface 1214 may be constructed. Surface A is constructed of a layer of heat capacitive material 1218, such as sand, on which is a layer of a dark, highly conductive material 1216 such as black steel. Surface B is similar to surface A except that a layer of insulation 1222 is laid under the heat capacitive material 1218 to better retain heat. Surface C is constructed of a layer of the heat capacitive material 1218 on which is a layer of a dark, sealing membrane surface 1226 such as PVC, polypropylene or EPDM. Surface D is similar to surface C except that a layer of the insulation 1222 is under the layer of heat capacitive material 1218.

In an alternative embodiment (not shown), the nozzle 1202, nozzle riser 1204 nozzle header 1206 and louvred fence 1212 can be removed from the evaporative spray pond 1212. The result is an evaporative pond, which can also be used as a reconcentrator.

In a further alternative embodiment (not depicted), the heat exchanger 1324 may be fluidly coupled to the nozzle header 1206 to provide additional energy that can be used in the evaporation process. The more heat is supplied via the heat exchanger 1324, the smaller the area of the pond catchment 1232 needs to be. The heat exchanger 1324 can, for example, supply 60% of the energy used in the evaporation process, with the remaining 40% coming from energy absorbed by the surface area of the pond catchment 1232.

The natural draft evaporative tower 1301 is composed of a tower base 1314 inside of which lies a shallow layer of tower catchment 1316 and on which is supported a tower housing 1302. As with the spray pond 1201, the tower catchment 1316 can be pumped to the concentrate reservoir 1020 via the fluid conduit 1236, and fluid from the concentrate reservoir 1020 can be pumped to a dispersive nozzle 1304 via the fluid conduit 1238. The fluid first passes through the heat exchanger 1324 that is coupled to an external heat source as described above, which provides low grade heat to the fluid to replace heat lost during evaporation. Spray falling from the nozzle 1304 evaporates as it falls towards the catchment 1316, aided by an influx of air through air intakes 1310, thereby increasing the salt concentration of the catchment 1316. The spray also hits fill material 1312, which provides increased surface area for the saltwater to flow over and increases mass transfer between the saltwater and the air, thereby aiding in evaporation.

The forced draft evaporative tower 1401 is similar to the natural draft evaporative tower 1301 as it is composed of a tower base 1418 inside of which lies a shallow layer of tower catchment 1420 and on which is supported a tower housing 1402. The tower catchment 1420 can be pumped to the concentrate reservoir 1020 via the fluid conduit 1236, and fluid from the concentrate reservoir 1020 can be pumped to a dispersive nozzle 1304 via the fluid conduit 1238. The fluid first passes through the heat exchanger 1324 that is coupled to an external heat source as described above, which provides low grade heat to the fluid to replace heat lost during evaporation. Spray falling from the nozzle 1304 evaporates as it falls towards the catchment 1420, aided by an influx of air through air intakes 1310 and by the draft provided by a fan 1412, thereby increasing the salt concentration of the catchment 1316. The spray also hits fill material 1312, which provides increased surface area for the saltwater to flow over and increases mass transfer between the saltwater and the air, thereby aiding in evaporation. Demister 1414 helps to prevent spray from damaging the fan 1412 and escaping from the top of the tower 1401.

Any of the reconcentrators depicted in FIGS. 12-14 can reside on land or float at sea.

EXAMPLE

An example of a plant 1001 composed of a four stage dialytic stack 901 coupled to a reconcentrator 1032 in the form of an evaporative spray pond 1201 will now be discussed.

The dialytic stack has a total of 800 drive cells and 100 desalination cells. The cation exchange membrane 120 used is a Neosepta AFN membrane. The anion exchange membrane 122 used is a Neosepta CM-1 membrane. Each membrane 120, 122 has a surface area of 1500 cm$^2$ (each membrane 120, 122 has a height of 50 cm and a depth of 30 cm) that interfaces with the product, diluent, or concentrate. The thickness of each of the product, diluent and concentrate chambers is 0.02 cm. The anode and cathode 124, 126 are made of platinised titanium. The gaskets between chambers are made of polypropylene.

The plant 1001 generates 1 m³ of drinkable water per day at 0.04% salt concentration per day. The product feed has a salt concentration of 3.50% when it is input into the dialytic stack 901. The diluent also has a salt concentration of 3.50% and the concentrate has a salt concentration of 18.00% when they are input into the dialytic stack 901. As they leave the dialytic stack 901, the diluent and concentrate have salt concentrations of 4.90% and 16.90%, respectively. Diluent, concentrate and product feed flow into the dialytic stack 901 at rates of 38.7 m³/day, 36.4 m³/day and 1.01 m³/day, respectively. Diluent and concentrate flow out of the dialytic stack 901 at 38.92 m³/day and 36.16 m³/day, respectively.

The salt concentration of the water in the water source 1004 is 3.50%. Water is drawn from the water source 1004 at a rate of 39.75 m³/day. Of this water, 1.01 m³/day is sent to the saltwater reservoir 1010, while 38.74 m³/day is sent to the diluent reservoir 1026. A portion of the used diluent is sent from the dialytic stacks 1002 to the concentrate reservoir 1020 at a rate of 10.9 m³/day. The remaining portion of the used diluent is discharged directly to the saltwater reservoir 1010 at a rate of 28.0 m³/day and is not sent to the diluent reservoir 1026.

The evaporative spray pond 1201 has a pond surface 1214 area of 75 m². The pond 1201 uses three nozzles 1202. The percent of water that evaporates per nozzle spray cycle is 4.0%. The spray pond 1201 accepts fluid from the dialytic stacks 1002 at a concentration of 16.90%, and returns fluid to the concentrate reservoir 1020 at a concentration of 18.00%.

While illustrative embodiments of the invention have been described, it will be appreciated that various changes can be made therein without departing from the scope and spirit of the invention. The invention is therefore to be considered limited solely by the scope of the appended claims

What is claimed is:

1. A method for desalinating saltwater, comprising:
   (a) generating a drive voltage by:
      (i) flowing a diluent of a first ionic concentration through a diluent chamber;
      (ii) flowing a concentrate of a second ionic concentration that is greater than the first ionic concentration through a concentrate chamber, the concentrate and diluent chambers forming a drive cell and sharing one of an anion and cation exchange membrane such that anions or cations flow from the concentrate chamber to the diluent chamber through the exchange membrane;
   (b) applying a sufficient voltage that comprises the drive voltage across a product chamber through which flows the saltwater to be desalinated and that is in ionic communication with the drive cell, the product chamber bounded by and in ionic communication with a product chamber anion exchange membrane on one side and bounded by and in ionic communication with a product chamber cation exchange membrane on another side, wherein the sufficient voltage equals or exceeds a desalination voltage of the product chamber such that cations and anions migrate from the saltwater through the product chamber cation and anion exchange membranes, respectively; and
   (c) reversing the polarity of the drive and sufficient voltages to descale the anion and cation exchange membranes;

wherein saltwater exiting the product chamber has a lower ionic concentration than diluent exiting the diluent chamber.

2. A method as claimed in claim 1 further comprising flowing solution having an ionic concentration greater than or equal to that of the saltwater to be desalinated through anion and cation discharge chambers, the anion and cation discharge chambers in ionic communication with the product chamber via the product chamber anion exchange membrane and the product chamber cation exchange membrane, respectively.

3. A method as claimed in claim 2 wherein the diluent is the solution flowing through the anion and cation discharge chambers.

4. A method as claimed in claim 2 wherein the diluent and the saltwater to be desalinated are the same.

5. A method as claimed in claim 2 wherein the diluent and the concentrate are saltwater, the salt concentration of the concentrate being higher than the salt concentration of the diluent.

6. A method as claimed in claim 2 wherein the drive voltage is equal to or greater than the desalination voltage.

7. A method as claimed in claim 2 further comprising flowing an electrolyte through anode and cathode electrolyte chambers, the anode electrolyte chamber bounded on a first side by and in ionic communication with an anode stack end ion exchange membrane and bounded on another side by and in electrical communication with an anode, and the cathode electrolyte chamber bounded on a first side by and in ionic communication with a cathode stack end ion exchange membrane and bounded on another side by and in electrical communication with a cathode, the anode and cathode electrolyte chambers ionically communicative with the product chamber via the anode and cathode stack end ion exchange membranes, respectively, and the anode and cathode electrically communicative with each other such that electrons flow from the anode to the cathode.

8. A method as claimed in claim 7 further comprising applying an external voltage across the anode and the cathode by using a voltage source electrically coupled between the anode and cathode.

9. A method as claimed in claim 7 further comprising powering an electrical load electrically coupled between the anode and cathode when the drive voltage is greater than the desalination voltage.

10. A method as claimed in claim 7 wherein the electrolyte comprises a sodium, calcium, magnesium or potassium cation and the anode and cathode ion exchange membranes are both cation exchange membranes.

11. A method as claimed in claim 7 wherein the electrolyte comprises a chlorine, sulphate or bromine anion and the anode and cathode ion exchange membranes are both anion exchange membranes.

12. A method as claimed in claim 7 wherein the electrolyte is selected from the group consisting of $Na_2SO_4$, NaCl, NaOH, HCl, $Na_3Fe(CN)_6$, $Na_2S_4O_6$, $Na_2S_2O_3$, $Na_4Fe(CN)_6$, $K_3Fe(CN)_6$, $K_4Fe(CN)_6$, $Na_2S_2O_3$, $NH_4Cl$, $NH_4$ $Na_2Cr_2O_7$, and $CrCl_3$.

13. A method as claimed in claim 7 further comprising pumping the electrolyte from one of the anode and cathode electrolyte chambers to the other of the anode and cathode electrolyte chambers such that electrochemical reaction by-products formed in one of the anode and cathode electrolyte chambers can be used as a reactant in the other of the electrolyte chambers.

14. A method as claimed in claim 2 wherein the diluent and the concentrate flow through the diluent and concentrate chambers, respectively, in countercurrent directions.

15. A method as claimed in claim 2 further comprising:
(a) flowing concentrate through first and second electrolyte chambers, the first electrolyte chamber bounded on one side by and in ionic communication with a first ion exchange membrane and bounded on another side by and in ionic communication with a porous first end plate and the second electrolyte chamber bounded on a first side by and in ionic communication with a second ion exchange membrane and bounded on a second side by and in ionic communication with a porous second end plate, the first and second electrolyte chambers ionically communicative with the product chamber via the first and second ion exchange membranes, respectively; and
(b) submerging the porous first and second end plates within a conductive bath such that ionic current flows between the conductive bath and the porous first and second end plates.

16. A method as claimed in claim 2 further comprising:
(a) flowing the saltwater to be desalinated through an initial desalination stage in series ionic communication with the drive cell, the initial desalination stage comprising an initial stage product chamber bounded on one side by and in ionic communication with an initial stage product chamber anion exchange membrane and bounded on another side by and in ionic communication with an initial stage product chamber cation exchange membrane, the initial stage product chamber having a desalination voltage such that when a voltage is applied to the initial stage product chamber in excess of the desalination voltage cations and anions migrate from the saltwater through the initial stage product chamber cation and anion exchange membranes, respectively;
(b) flowing the saltwater to be desalinated through a subsequent desalination stage, the subsequent desalination stage in series ionic communication with the drive cell, the subsequent desalination stage comprising a subsequent desalination stage product chamber bounded on a first side by and in ionic communication with a subsequent stage product chamber anion exchange membrane and bounded on another side by and in ionic communication with a subsequent stage product chamber cation exchange membrane, the subsequent stage product chamber having a desalination voltage such that when a voltage is applied to the subsequent stage product chamber in excess of the desalination voltage cations and anions migrate from the saltwater through the subsequent stage product chamber cation and anion exchange membranes, respectively, the saltwater to be desalinated flowing through the initial stage and subsequent stage product chambers; and
(c) applying the sufficient voltage across the initial and subsequent stage product chambers, the sufficient voltage comprising the drive voltage and being greater than or equal to the sum of the desalination voltages of the initial and subsequent stage product chambers.

17. A method as claimed in claim 16 wherein one or both of the initial stage and subsequent stage product chambers comprise a plurality of product chambers, and wherein flowing the saltwater to be desalinated through the initial and subsequent desalination stages comprises flowing the saltwater to be desalinated in parallel through the plurality of product chambers of any given stage.

18. A method for desalinating saltwater, comprising:
(a) generating a drive voltage using a plurality of drive cells in ionic communication with each other by:
(i) flowing a diluent of a first ionic concentration through a diluent chamber of each of the drive cells;
(ii) flowing a concentration of a second ionic concentration that is greater than the first ionic concentration through a concentrate chamber of each of the drive cells, the concentrate and diluent chambers of each of the drive cells sharing one of an anion and cation exchange membrane such that anions or cations flow from the concentrate chamber to the diluent chamber through the exchange membrane;
(b) applying the drive voltage across a product chamber through which flows the saltwater to be desalinated and that is in ionic communication with the drive cells, the product chamber bounded by and in ionic communication with a product chamber anion exchange membrane on one side and bounded by and in ionic communication with a product chamber cation exchange membrane on another side, wherein the drive voltage equals or exceeds a desalination voltage of the product chamber such that cations and anions migrate from the saltwater through the product chamber cation and anion exchange membranes, respectively; and
(c) reversing the polarity of the drive and sufficient voltages to descale the anion and cation exchange membranes;
wherein saltwater exiting the product chamber has a lower ionic concentration than diluent exiting the diluent chamber.

19. A method as claimed in claim 18 further comprising flowing solution having an ionic concentration greater than or equal to that of the saltwater to be desalinated through anion and cation discharge chambers, the anion and cation discharge chambers in ionic communication with the product chamber via the product chamber anion exchange membrane and the product chamber cation exchange membrane, respectively.

20. A method as claimed in claim 18, wherein the diluent and the saltwater to be desalinated are the same.

21. A method as claimed in claim 18, wherein the diluent and the concentrate are saltwater, the salt concentration of the concentrate being higher than the salt concentration of the diluent.

22. A method as claimed in claim 18 further comprising flowing an electrolyte through anode and cathode electrolyte chambers, the anode electrolyte chamber bounded on a first side by and in ionic communication with an anode stack end ion exchange membrane and bounded on another side by and in electrical communication with an anode, and the cathode electrolyte chamber bounded on a first side by and in ionic communication with a cathode stack end ion exchange membrane and bounded on another side by and in electrical communication with a cathode, the anode and cathode electrolyte chambers ionically communicative with the product chamber via the anode and cathode stack end ion exchange membranes, respectively, and the anode and cathode electrically communicative with each other such that electrons flow from the anode to the cathode.

23. A method as claimed in claim 18, wherein the diluent is the solution flowing through the anion and cation discharge chambers.

24. A method as claimed in claim 18, wherein the diluent and the concentrate flow through the diluent and concentrate chambers, respectively, in countercurrent directions.

* * * * *